US012566274B2

(12) United States Patent
Taneski et al.

(10) Patent No.: US 12,566,274 B2
(45) Date of Patent: Mar. 3, 2026

(54) GUIDED FLASH LIDAR

(71) Applicant: Ouster, Inc., San Francisco, CA (US)

(72) Inventors: Filip Taneski, Edinburgh (GB); Tarek Al Abbas, Edinburgh (GB); Robert Henderson, Edinburgh (GB)

(73) Assignee: Ouster, Inc., San Francisco, CA (US)

( * ) Notice: Subject to any disclaimer, the term of this patent is extended or adjusted under 35 U.S.C. 154(b) by 158 days.

(21) Appl. No.: 18/533,020

(22) Filed: Dec. 7, 2023

(65) Prior Publication Data

US 2024/0192375 A1 Jun. 13, 2024

Related U.S. Application Data

(60) Provisional application No. 63/431,311, filed on Dec. 8, 2022.

(51) Int. Cl.
G01S 17/894 (2020.01)
G01S 7/4863 (2020.01)

(52) U.S. Cl.
CPC .......... G01S 17/894 (2020.01); G01S 7/4863 (2013.01)

(58) Field of Classification Search
CPC .... G01S 17/894; G01S 7/4863; G01S 7/4865; G01S 17/42; G01S 17/86; G01S 17/931
USPC ........................................ 382/154
See application file for complete search history.

(56) References Cited

U.S. PATENT DOCUMENTS

2020/0300984 A1 9/2020 Matsuura et al.
2020/0341144 A1* 10/2020 Pacala ................... G01S 17/894
2021/0302550 A1 9/2021 Dutton et al.

OTHER PUBLICATIONS

EP23215269.4, "Extended European Search Report", Apr. 26, 2024, 17 pages.

(Continued)

*Primary Examiner* — Stephen P Coleman
(74) *Attorney, Agent, or Firm* — Kilpatrick Townsend & Stockton LLP

(57) ABSTRACT
Systems, methods, and apparatus that can save power and provide improved lidar images. An example can save power by limiting received photon accumulation to a range of bins corresponding to a range of distances where a position of an object has been predetermined. By not accumulating or binning photon data over an entire range, the amount of data stored each laser cycle can be reduced, and other power saving measures can be realized. By limiting a range over which photon data is accumulated, the resolution of each bin can be increased, thereby improving a resulting lidar image. The position of an object can be predetermined using a stereo camera that can be coupled to, or included as part of, a lidar system. The stereo camera can acquire a pair of images offset by a spacing, and from the pair of images can generate stereo depth estimates. The depth estimates can be mapped to corresponding lidar pixels. The depth estimates can be converted to time intervals, which can be provided to the lidar system. The lidar system can use this to narrow the range over which photon data is collected for one or more pixels.

16 Claims, 17 Drawing Sheets

(56)             References Cited

OTHER PUBLICATIONS

Gyongy et al., "A 200kFPS, 256x128 SPAD dToF sensor with peak tracking and smart readout", International Image Sensor Workshop 2021, Sep. 23, 2021, pp. 1-5.
Zhang et al., "A 30-frames/s, 252x144 SPAD Flash LiDAR With 1728 Dual-Clock 48.8-ps TDCs, and Pixel-Wise Integrated Histogramming", Institute of Electrical and Electronics Engineers Journal of Solid-state Circuits, vol. 54, No. 4, Apr. 1, 2019, pp. 1137-1151.

* cited by examiner

200

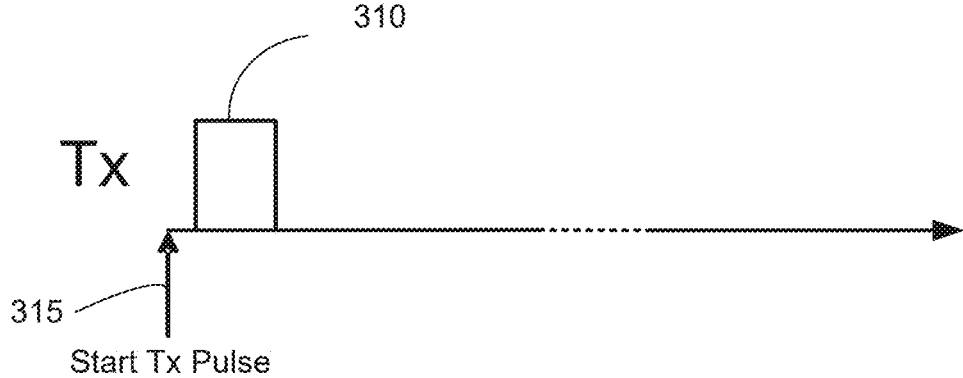
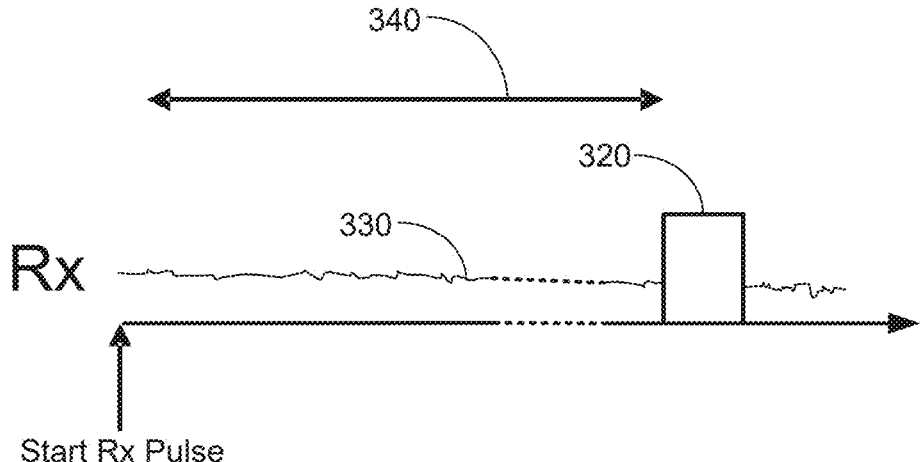
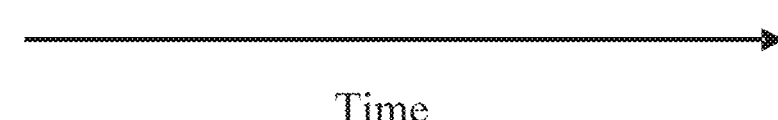
Time
FIG. 3

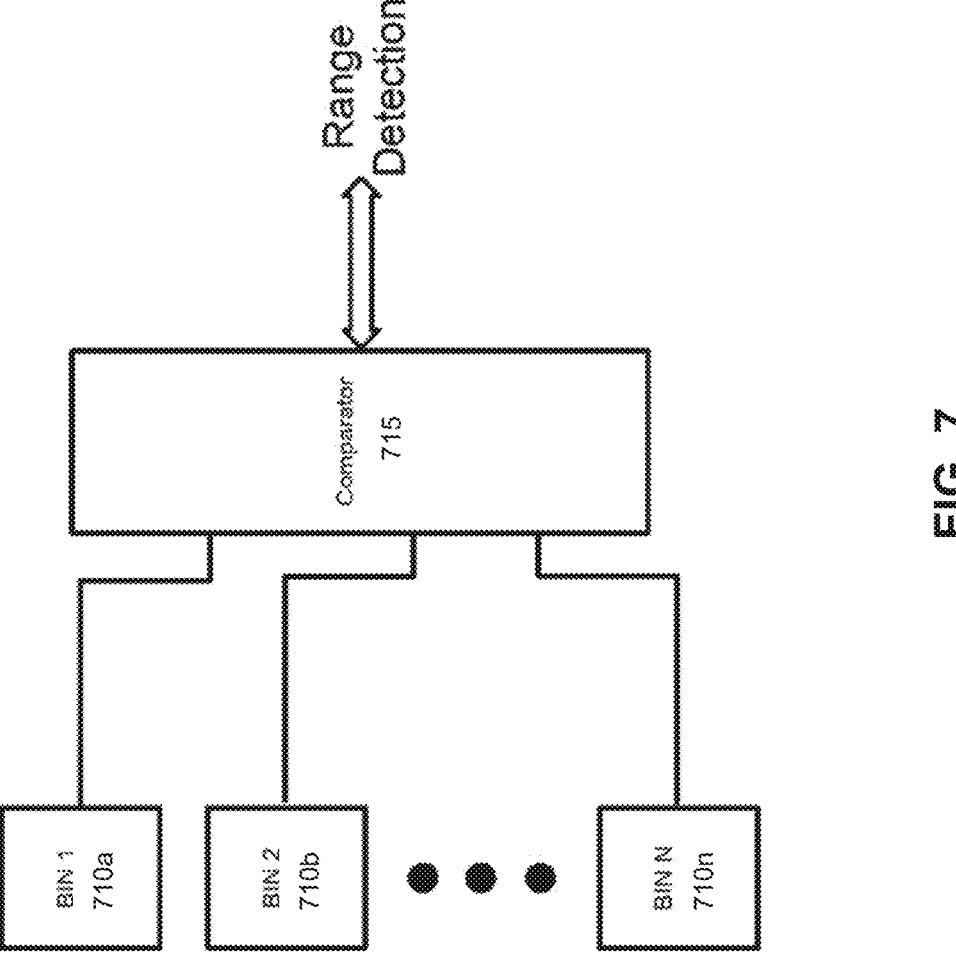
FIG. 7

BIN 4
810d
150 ~ 200

BIN 3
810c
100 ~ 150

BIN 2
810b
50 ~ 100

BIN 1
810a
0 ~ 50

BIN 4
810d
187.5 ~ 200

BIN 3
810c
175 ~ 187.5

BIN 2
810b
162.5 ~ 175

BIN 1
810a
150 ~ 162.5

BIN 4
810d
159.3 ~ 162.5

BIN 3
810c
156.2 ~ 159.3

BIN 2
810b
153.1 ~ 156.2

BIN 1
810a
150 ~ 153.1

BIN 4
810d
157.5 ~ 158

BIN 3
810c
157 ~ 157.5

BIN 2
810b
156.5 ~ 157

BIN 1
810a
156 ~ 156.5

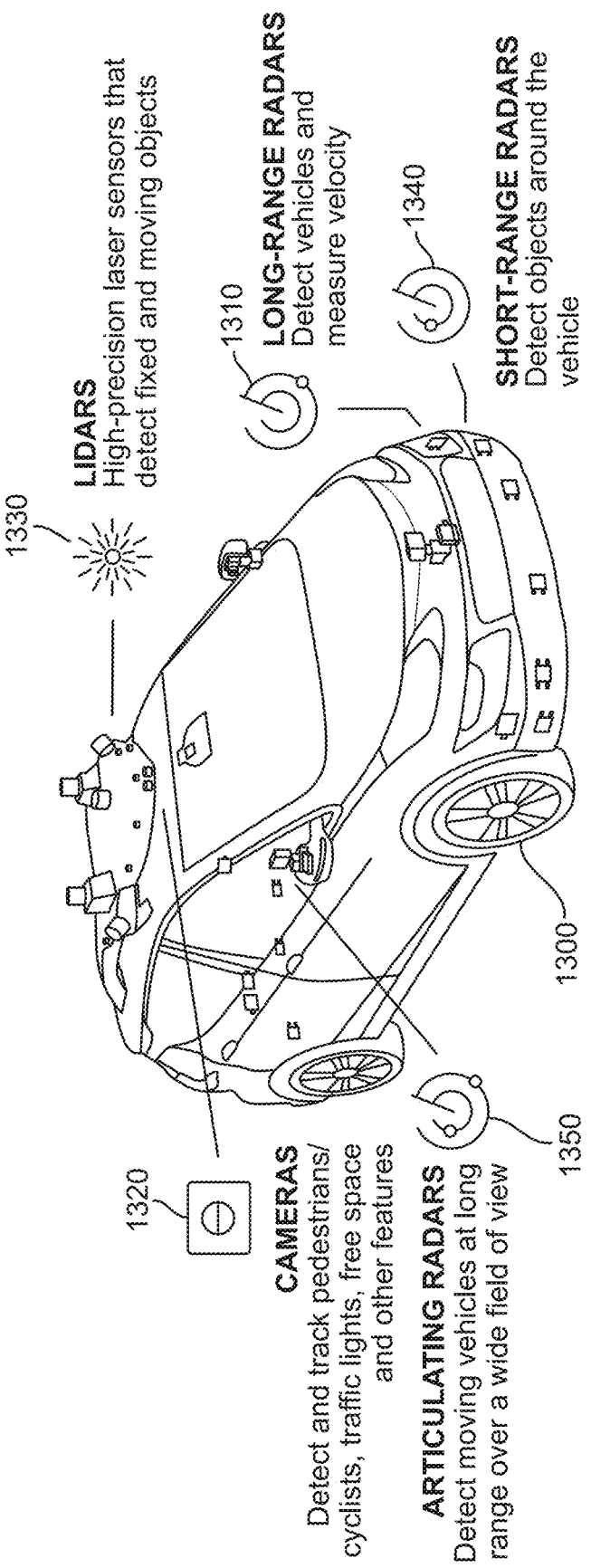

LONG-RANGE RADARS
Detect vehicles and measure velocity

1340

SHORT-RANGE RADARS
Detect objects around the vehicle

1330

LIDARS
High-precision laser sensors that detect fixed and moving objects

1320

CAMERAS
Detect and track pedestrians/ cyclists, traffic lights, free space and other features

ARTICULATING RADARS
Detect moving vehicles at long range over a wide field of view

1350

1300

GUIDED FLASH LIDAR

CROSS-REFERENCES TO RELATED APPLICATIONS

This application is a continuation of U.S. patent application No. 63/431,311, filed Dec. 8, 2022, which is incorporated by reference.

BACKGROUND

This disclosure relates generally to lidar systems and more specifically increasing the dynamic range of lidar systems.

Time-of-flight (ToF) based imaging is used in a number of applications, including range finding, depth profiling, and 3D imaging, for example light imaging, detection, and ranging (LiDAR, or lidar). Direct time-of-flight (dToF) measurement includes directly measuring the length of time between emitting radiation from emitter elements and sensing the radiation by sensor elements after reflection from an object or other target. The distance to the target can be determined from the measured length of time. Indirect time-of-flight measurement includes determining the distance to the target by phase modulating the amplitude of the signals emitted by the emitter elements of the lidar system and measuring phases (e.g., with respect to delay or shift) of the echo signals received at the sensor elements of the lidar system. These phases can be measured with a series of separate measurements or samples.

In specific applications, the sensing of the reflected radiation in either direct or indirect time-of-flight systems can be performed using an array of detectors, for example an array of Single-Photon Avalanche Diodes (SPADs). One or more detectors can define a sensor for a pixel, where a sensor array can be used to generate a lidar image for the depth (range) to objects for respective pixels.

When imaging a scene, these sensors, which can also be referred to as ToF sensors or photosensors, can include circuits that time-stamp and count incident photons as reflected from a target. Data rates can be compressed by histogramming timestamps. For instance, for each pixel, a histogram having bins (also referred to as "time bins") corresponding to different ranges of photon arrival times can be stored in memory, and photon counts can be accumulated in different time bins of the histogram according to their arrival time. A time bin can correspond to a duration of, e.g., 1 ns, 2 ns, or the like. Some lidar systems can perform in-pixel histogramming of incoming photons using a clock-driven architecture and a limited memory block, which can provide a significant increase in histogramming capacity. However, since memory capacity is limited and typically cannot cover the desired distance range at once, such lidar systems can operate in "strobing" mode. "Strobing" refers to the generation of detector control signals (also referred to herein as "strobe signals" or "strobes") to control the timing and/or duration of activation (also referred to herein as "detection windows" or "strobe windows") of one or more detectors of the lidar system, such that photon detection and histogramming is performed sequentially over a set of different time windows, each corresponding to an individual distance subrange, so as to collectively define the entire distance range. In other words, partial histograms can be acquired for subranges or "time slices" corresponding to different sub-ranges of the distance range and then amalgamated into one full-range histogram. Thousands of time bins (each corresponding to respective photon arrival times)

can typically be used to form a histogram sufficient to cover the typical time range of a lidar system (e.g., microseconds) with the typical time-to-digital converter (TDC) resolution (e.g., 50 to 100 picoseconds).

Reflected light from the emitter elements can be received using a sensor array. The sensor array can be an array of SPADs for an array of pixels, also referred to as channels, where each pixel includes one or more SPADs to form one or more detector components. These SPADs can work in conjunction with other circuits, for example address generators, accumulation logic, memory circuits, and the like, to generate a lidar image.

It can be desirable that lidar systems consume a reduced amount of power. Doing so can simplify power delivery, can reduce generated heat, and improve the reliability of a lidar system. It can also be desirable that resulting images produced by lidar systems have an improved resolution.

Thus, what is needed are systems, methods, and apparatus that can save power and provide improved lidar images.

SUMMARY

Accordingly, embodiments of the present invention can provide systems, methods, and apparatus that can save power and provide improved lidar images. An illustrative embodiment of the present invention can save power by limiting received photon accumulation to a range of bins corresponding to a range of distances where a position of an object has been predetermined. By not accumulating or binning photon data over an entire range, the amount of data stored each laser cycle can be reduced and other power saving measures can be realized. By limiting a range over which photon data is accumulated, the resolution of each bin can be increased, thereby improving a resulting lidar image.

These and other embodiments of the present invention can provide various methods for a position or distance of an object to be predetermined. In one example, a distance to the object can be found by initially accumulating data over an entire range. That is, photon data can be accumulated over an entire range for a first number of cycles. For one or more pixels, a first distance to the object can be determined. Photon data for the one or more pixels can be then accumulated over a limited range corresponding to the first distance for a second number of cycles. For example, photon data can be collected over a range of pixels starting with a first number of bins before a detected peak and a second number of bins following the detected peak, where the first and second numbers are either the same or different numbers.

In another example, data provided by a second system can be used to determine a distance to an object. As an example, a stereo camera can be coupled to, or included as part of, a lidar system. The stereo camera can acquire a pair of images offset by a spacing, and from the pair of images can generate stereo depth estimates. The depth estimates can be mapped to corresponding lidar pixels. The depth estimates can be converted to time intervals, which can be provided to the lidar system. The lidar system can use this to narrow the range over which photon data is collected for one or more pixels. As another example, a vehicle can include adaptive cruise control, blind spot warnings, optical cameras, and other driver assist and safety systems. These and other systems can provide distance values to a lidar system according to embodiments of the present invention.

For example, an adaptive cruise control system on a trailing vehicle can use radar, laser, or camera, or other systems to detect an approximate distance to a leading vehicle. This distance can be converted to time intervals and provided to a lidar system. The adaptive cruise control system can further detect a direction to the leading vehicle, or the adaptive cruise control system can map this distance information onto corresponding lidar pixels. This information can be mapped to corresponding lidar pixels by either the adaptive cruise control system or the lidar. The lidar system can then collect photon data for one or more pixels over a narrowed range corresponding to the time intervals provided by the automatic cruise control system.

As another example, a blind-spot warning system can use cameras, ultrasonics, or other systems to determine that an object, for example a second vehicle, is within a certain distance in a particular direction. The distance information can be converted to a time interval or maximum time and provided to the lidar system. The direction information can be mapped to corresponding lidar pixels by either the blind spot warning system or the lidar. The lidar system can then collect photon data for one or more pixels over a narrowed range corresponding to the time intervals provided by the blind spot warning system.

As another example, lane assist or lane departure warning systems can use camera, infrared sensor, laser, or other systems to determine a position of a lane. The position information can include distance and position information. The distance information can be converted to a time interval or maximum time and provided to the lidar system. The direction information can be mapped to corresponding lidar pixels by either the lane assist or lane departure warning system or the lidar. The lidar system can then collect photon data for one or more pixels over a narrowed range corresponding to the time intervals provided by the lane assist or lane departure warning system.

These various systems can provide distance (or time) and position (or corresponding pixel) information to a lidar system. The lidar system can then narrow the range over which photon data is accumulated. This can help to reduce power in several ways. For example, by storing less photon data for a number of cycles, power can be reduced. Where a distance to an object for one or more pixels is further than a range of the lidar system, corresponding emitters can be prevented from firing and no photon data is accumulated, further saving power. Where a distance to an object for one or more pixels is nearby, emitter power can be reduced and photon data accumulation can be limited to bins corresponding to a short time-of-flight. A sensitivity of SPADs corresponding to one or more pixels can be adjusted to compensate for reduced emitter power when objects are nearby. SPADs and other receiver circuits can be turned off when photon data is not being accumulated, further saving power.

Information from earlier accumulations or these second systems can be used in other ways as well. For example, when data is accumulated for a shorter duration, bin size can be decreased leading to a greater image resolution. As another example, relative speed data from an adaptive cruise control system can be used to combine cycles or subframes in an accurate manner.

These and other embodiments of the present invention can be used in a variety of settings. For example, a stereo camera and a lidar system can be included on a vehicle, for example an autonomous vehicle, partially autonomous vehicle, or other type of vehicle. A stereo camera and a lidar system can be included on a stationary device, where the stationary device can be used for security, traffic or personnel management, toll booths, parking meters, and others. A stereo camera and a lidar system can be included in an electronic device, for example a wearable computing device, smart phone, or other electronic device.

These and other embodiments of the present invention can incorporate predictive behavior and tracking. Behavior prediction and the use of tracking can help a lidar system to avoid losing track of an object, for example a moving vehicle or pedestrian.

These and other embodiments of the present invention can help to reduce circuit complexity as well. In many circumstances, several bins associated with a pixel are not used. This can allow a lidar system to have a reduced memory size. In these and other embodiments of the present invention, photon count data can be dynamically stored in memory at locations that depend on the data storage needs of previous pixels. The ability of a pixel to store data at different locations in memory can provide a degree of configurability to the lidar system without increasing the memory size.

In these and other embodiments of the present invention, a second lidar system can be used in conjunction with a lidar system. That is, a lidar system can utilize a second lidar system in a stereo arrangement. Such an arrangement can use intensity information along with depth information from each lidar system to extend a depth range as compared to a single lidar system. In one example, the stereo lidar system is initially calibrated. This calibration can align the two lidar systems in a stereo configuration. After a calibration routine, depth and intensity images can be generated and processed to extract further depth information. The intensity images can be rectified and processed to resolve pixel disparities between the two intensity images that can occur due to shot and other types of noise. The pixel disparities can be converted to depth using the previously generated calibration data. The resulting image can be de-rectified and added to the depth information to generate the final depth image.

Some embodiments described herein provide methods, systems, and devices including electronic circuits that provide a lidar system including one or more emitter elements (including one or more light emitting devices or lasers, for example surface- or edge-emitting laser diodes; generally referred to herein as emitters or emitter elements) that output optical signals (referred to herein as emitter signals) in response to emitter control signals, one or more detector elements or sensor elements (including photodetectors, for example photodiodes, including avalanche photodiodes and single-photon avalanche detectors; generally referred to herein as detectors) that output detection signals in response to incident light (also referred to as detection events), and/or one or more control circuits that are configured to operate a non-transitory memory device to store data indicating the detection events in different subsets of memory banks during respective subframes of an imaging frame, where the respective subframes include data collected over multiple cycles or pulse repetitions of the emitter signals. For example, the one or more control circuits may be configured to operate the emitter and detector elements to collect data over fewer pulse repetitions of the emitter signal with smaller memory utilization (e.g., fewer memory banks) when imaging closer distance subranges, and to collect data over more pulse repetitions of the emitter signal with larger memory utilization (e.g., more memory banks) when imaging farther distance subranges.

In some embodiments, the control circuit(s) include a timing circuit that is configured to direct photon counts to a first subset of the memory banks based on their times-of-arrival with respect to the timing of the emitter signal during a first subframe, and to a second subset of the memory banks based on their times-of-arrival with respect to the timing of the emitter signal during a second subframe, thereby varying the number of memory banks and/or the time bin allocation of each memory bank or storage location for respective subframes of the imaging frame.

According to some embodiments of the present invention, a lidar detector circuit includes a plurality of detector pixels, with each detector pixel of the plurality comprising one or more detector elements; a non-transitory memory device comprising respective memory storage locations or memory banks configured to store photon count data for respective time bins or photon times-of arrival; and at least one control circuit configured to vary or change the number of memory banks and/or the allocation of respective time bins to the respective memory banks responsive to a number of pulse repetitions of an emitter signal. The at least one control circuit may be configured to change the respective time bins allocated to the respective banks from one subframe to the next by altering the timing of respective memory bank enable signals relative to the time between pulses of the emitter signal for the respective subframes. In some embodiments, the time bins of the respective subframes may have a same duration or bin width.

Various detector components formed of one or more SPADs can be implemented in these and other embodiments of the present invention. These detector components can be formed as arrays of individual SPADs, where the individual SPADs are connected together in different numbers to provide a number of detector components having different sensitivities.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 3 illustrates the operation of a typical lidar system that can be improved by embodiments;

FIG. 7 illustrates a system for determining a target range based on a distribution of photon counts over a strobe window;

FIG. 13 illustrates a system that includes a number of second systems that can provide distance information to a lidar system according to an embodiment of the present invention;

DETAILED DESCRIPTION

Embodiments of the present invention can provide circuits, methods, and apparatus that can provide lidar systems having an increased dynamic range. One example can provide a lidar system having emitter elements to emit optical signals and sensor elements to detect incident photons. The emitter elements can emit a first optical signal having a series of pulses at a first power level and a second optical signal having a series of pulses at a second power level. Following first pulses, the sensor elements can determine a number of photons detected during a first number of time bins that begin with an initial time bin and extend to a first time bin. Following the second pulses, the sensor elements can determine a number of photons detected during a second number of time bins beginning with the initial time bin and extending to a second time bin. The second power level can differ from the first power level and the second number can differ from the first number.

1. Example Lidar System

Figure 1:
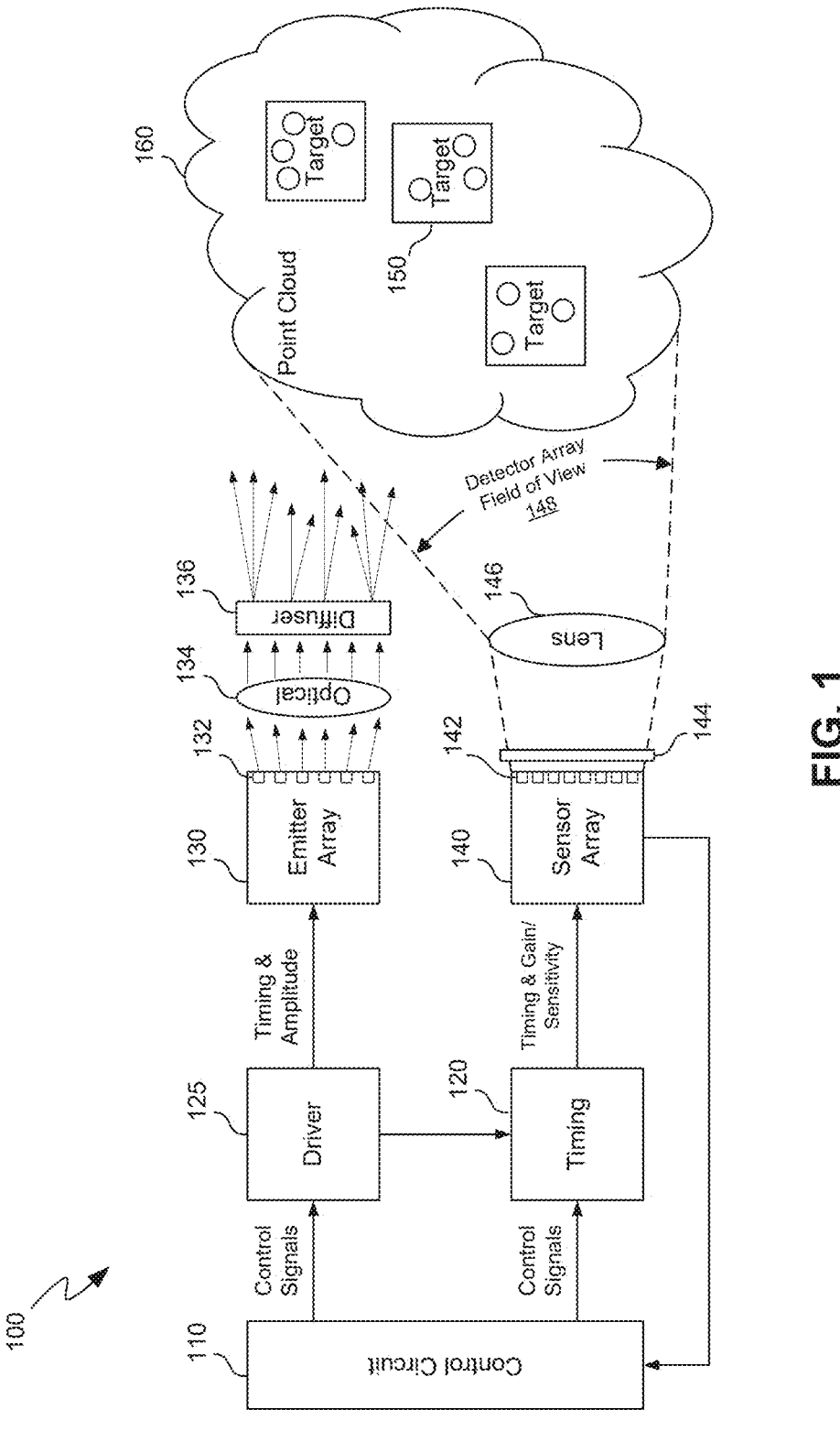
FIG. 1 is a simplified block diagram of a lidar system according to some embodiments.

FIG. 1 illustrates an example light-based 3D sensor system 100, for example a Light Detection and Ranging (Lidar, or lidar) system, in accordance with some embodiments of the invention. Lidar system 100 can include a control circuit 110, a timing circuit 120, driver circuitry 125, an emitter array 130 and a sensor array 140. Emitter array 130 can include a plurality of emitter units (or emitter elements) 132 arranged in an array (e.g., a one- or two-dimensional array) and sensor array 140 can include a plurality of sensors or sensor elements 142 arranged in an array (e.g., a one- or two-dimensional array). The sensors 142 can be depth sensors, for example time-of-flight (ToF) sensors. In some embodiments each sensor 142 can include, for example, one or more single-photon detectors, for example Single-Photon Avalanche Diodes (SPADs). In some embodiments, each sensor 142 can be coupled to an in-pixel memory block 610 (shown in FIG. 6) that accumulates histogram data for that sensor 142, and the combination of a sensor and in-pixel memory circuitry is sometimes referred to as a "pixel" 142. Each emitter unit 132 of the emitter array 130 can include one or more emitter elements that can emit a radiation pulse (e.g., light pulse) or continuous wave signal at a time and frequency controlled by a timing generator or driver circuitry 125. In some embodiments, the emitter units 132 can be pulsed light sources, for example LEDs or lasers including vertical cavity surface emitting lasers (VCSELs)

that emit a cone of light (e.g., infrared light) having a predetermined beam divergence.

Emitter array 130 can project pulses of radiation into a field of view of the lidar system 100. Some of the emitted radiation can then be reflected back from objects in the field, for example targets 150. The radiation that is reflected back can then be sensed or detected by the sensors 142 within the sensor array 140. Control circuit 110 can implement a processor that measures and/or calculates the distance to targets 150 based on data (e.g., histogram data) provided by sensors 142. In some embodiments control circuit 110 can measure and/or calculate the time of flight of the radiation pulses over the journey from emitter array 130 to target 150 and back to the sensors 142 within the sensor array 140 using direct or indirect time-of-flight (ToF) measurement techniques.

In some embodiments, emitter array 130 can include an array (e.g., a one- or two-dimensional array) of emitter units 132 where each emitter unit is a unique semiconductor chip having one or more individual VCSELs (sometimes referred to herein as emitter elements) formed on the chip. An optical element 134 and a diffuser 136 can be disposed in front of the emitter units such that light projected by the emitter units passes through the optical element 134 (which can include, e.g., one or more Fresnel lenses) and then through diffuser 136 prior to exiting lidar system 100. In some embodiments, optical element 134 can be an array of lenses or lenslets (in which case the optical element 134 is sometimes referred to herein as "lens array 134" or "lenslet array 134") that collimate or reduce the angle of divergence of light received at the array and pass the altered light to diffuser 136. The diffuser 136 can be designed to spread light received at the diffuser over an area in the field that can be referred to as the field of view of the emitter array (or the field of illumination of the emitter array). In general, in these embodiments, emitter array 130, lens array or optical element 134, and diffuser 136 cooperate to spread light from emitter array 130 across the entire field of view of the emitter array. A variety of emitters and optical components can be used.

The driver circuitry 125 can include one or more driver circuits, each of which controls one or more emitter units. The driver circuits can be operated responsive to timing control signals with reference to a master clock and/or power control signals that control the peak power and/or the repetition rate of the light output by the emitter units 132. In some embodiments, each of the emitter units 132 in the emitter array 130 is connected to and controlled by a separate circuit in driver circuitry 125. In other embodiments, a group of emitter units 132 in the emitter array 130 (e.g., emitter units 132 in spatial proximity to each other or in a common column of the emitter array), can be connected to a same circuit within driver circuitry 125. Driver circuitry 125 can include one or more driver transistors configured to control the modulation frequency, timing, and/or amplitude of the light (optical emission signals) output from the emitter units 132.

In some embodiments, a single event of emitting light from the multiple emitter units 132 can illuminate an entire image frame (or field of view); this is sometimes referred to as a "flash" lidar system. Other embodiments can include non-flash or scanning lidar systems, in which different emitter units 132 emit light pulses at different times, e.g., into different portions of the field of view. The maximum optical power output of the emitter units 132 can be selected to generate a signal-to-noise ratio of the echo signal from the farthest, least reflective target at the brightest background illumination conditions that can be detected in accordance with embodiments described herein. In some embodiments, an optical filter (not shown) for example a bandpass filter can be included in the optical path of the emitter units 132 to control the emitted wavelengths of light.

Light output from the emitter units 132 can impinge on and be reflected back to lidar system 100 by one or more targets 150 in the field. The reflected light can be detected as an optical signal (also referred to herein as a return signal, echo signal, or echo) by one or more of the sensors 142 (e.g., after being collected by receiver optics 146), converted into an electrical signal representation (sometimes referred to herein as a detection signal), and processed (e.g., based on time-of-flight techniques) to define a 3-D point cloud representation 160 of a field of view 148 of the sensor array 140. In some embodiments, operations of lidar systems can be performed by one or more processors or controllers, for example control circuit 110.

Sensor array 140 includes an array of sensors 142. In some embodiments, each sensor 142 can include one or more photodetectors, e.g., SPADs. And in some particular embodiments, sensor array 140 can be a very large array made up of hundreds of thousands or even millions of densely packed SPADs. Receiver optics 146 and receiver electronics (including timing circuit 120) can be coupled to the sensor array 140 to power, enable, and disable all or parts of the sensor array 140 and to provide timing signals thereto. In some embodiments, sensors 142 can be activated or deactivated with at least nanosecond precision (supporting time bins of 1 ns, 2 ns, etc.), and in various embodiments, sensors 142 can be individually addressable, addressable by group, and/or globally addressable. The receiver optics 146 can include a bulk optic lens that is configured to collect light from the largest field of view that can be imaged by the lidar system 100, which in some embodiments is determined by the aspect ratio of the sensor array 140 combined with the focal length of the receiver optics 146.

In some embodiments, the receiver optics 146 can further include various lenses (not shown) to improve the collection efficiency of the sensors and/or an anti-reflective coating (also not shown) to reduce or prevent detection of stray light. In some embodiments, a spectral filter 144 can be positioned in front of the sensor array 140 to pass or allow passage of "signal" light (i.e., light of wavelengths corresponding to wavelengths of the light emitted from the emitter units) but substantially reject or prevent passage of non-signal light (i.e., light of wavelengths different from the wavelengths of the light emitted from the emitter units).

The sensors 142 of sensor array 140 are connected to the timing circuit 120. The timing circuit 120 can be phase-locked to the driver circuitry 125 of emitter array 130. The sensitivity of each of the sensor elements 142 or of groups of sensors 142 can be controlled. For example, when the sensor elements 142 include reverse-biased photodiodes, avalanche photodiodes (APD), PIN diodes, and/or Geiger-mode avalanche diodes (e.g., SPADs), the reverse bias can be adjusted. In some embodiments, a higher overbias provides higher sensitivity.

In some embodiments, control circuit 110, which can be, for example, a microcontroller or microprocessor, provides different emitter control signals to the driver circuitry 125 of different emitter units 132 and/or provides different signals (e.g., strobe signals) to the timing circuit 120 of different sensors 142 to enable/disable the different sensors 142 to detect the echo signal (or returning light) from the target 150. The control circuit 110 can also control memory storage operations for storing data indicated by the detection signals in a non-transitory memory or memory array that is included therein or is distinct therefrom.

Figure 2:
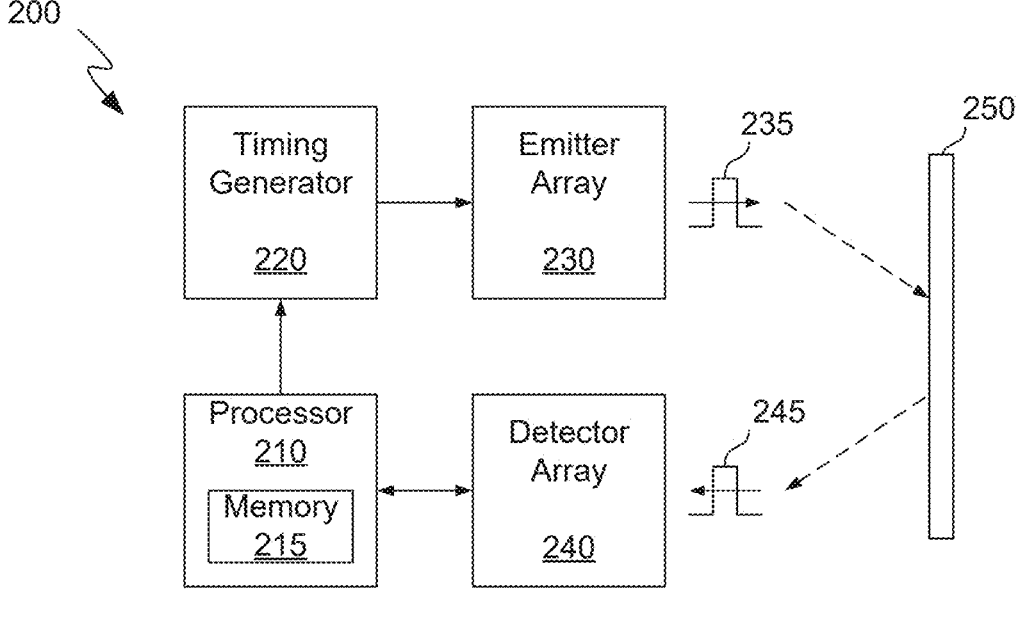
FIG. 2 is a simplified block diagram of components of a time-of-flight measurement system or circuit according to some embodiments.

FIG. 2 further illustrates components of a ToF measurement system or circuit 200 in a lidar application in accordance with some embodiments described herein. The circuit 200 can include a processor circuit 210 (for example a digital signal processor (DSP)), a timing generator 220 that controls timing of the illumination source (illustrated by way of example with reference to a laser emitter array 230), and an array of sensors (illustrated by way of example with reference to a sensor array 240). The processor circuit 210 can also include a sequencer circuit (not shown in FIG. 2) that is configured to coordinate operation of emitter units within the illumination source (emitter array 230) and sensors within the sensor array 240.

The processor circuit 210 and the timing generator 220 can implement some of the operations of the control circuit 110 and the driver circuitry 125 of FIG. 1. Similarly, emitter array 230 and sensor array 240 can be representative of emitter array 130 and sensor array 140 in FIG. 1. The laser emitter array 230 can emit laser pulses 235 at times controlled by the timing generator 220. Light 245 from the laser pulses 235 can be reflected back from a target (illustrated by way of example as object 250) and can be sensed by sensor array 240. The processor circuit 210 implements a pixel processor that can measure or calculate the time of flight of each laser pulse 235 and its reflected light 245 over the journey from emitter array 230 to object 250 and back to the sensor array 240.

The processor circuit 210 can provide analog and/or digital implementations of logic circuits that provide the necessary timing signals (for example quenching and gating or strobe signals) to control operation of the single-photon detectors of the sensor array 240 and that process the detection signals output therefrom. For example, individual single-photon detectors of sensor array 240 can be operated such that they generate detection signals in response to incident photons only during the gating intervals or strobe windows that are defined by the strobe signals, while photons that are incident outside the strobe windows have no effect on the outputs of the single-photon detectors. More generally, the processor circuit 210 can include one or more circuits that are configured to generate detector or sensor control signals that control the timing and/or durations of activation of the sensors 142 (or particular single-photon detectors therein), and/or to generate respective emitter control signals that control the output of light from the emitter units 132.

Detection events can be identified by the processor circuit 210 based on one or more photon counts indicated by the detection signals output from the sensor array 240, which can be stored in a non-transitory memory 215. In some embodiments, the processor circuit 210 can include a correlation circuit or correlator that identifies detection events based on photon counts (referred to herein as correlated photon counts) from two or more single-photon detectors within a predefined window (time bin) of time relative to one another, referred to herein as a correlation window or correlation time, where the detection signals indicate arrival times of incident photons within the correlation window. Since photons corresponding to the optical signals output from the emitter array 230 (also referred to as signal photons) can arrive relatively close in time with each other, as compared to photons corresponding to ambient light (also referred to as background photons), the correlator can be configured to distinguish signal photons based on respective times of arrival being within the correlation time relative to one another. Such correlators and strobe windows are described, for example, in U.S. Patent Application Publication No. 2019/0250257, entitled "Methods and Systems for High-Resolution Long Range Flash Lidar," which is incorporated by reference herein in its entirety for all purposes.

The processor circuit 210 can be small enough to allow for three-dimensionally stacked implementations, e.g., with the sensor array 240 "stacked" on top of processor circuit 210 (and other related circuits) that is sized to fit within an area or footprint of the sensor array 240. For example, some embodiments can implement the sensor array 240 on a first substrate, and transistor arrays of the processor circuit 210 on a second substrate, with the first and second substrates/wafers bonded in a stacked arrangement, as described for example in U.S. Patent Application Publication No. 2020/0135776, entitled "High Quantum Efficiency Geiger-Mode Avalanche Diodes Including High Sensitivity Photon Mixing Structures and Arrays Thereof," the disclosure of which is incorporated by reference herein in its entirety for all purposes.

The pixel processor implemented by the processor circuit 210 can be configured to calculate an estimate of the average ToF aggregated over hundreds or thousands of laser pulses 235 and photon returns in reflected light 245. The processor circuit 210 can be configured to count incident photons in the reflected light 245 to identify detection events (e.g., based on one or more SPADs within the sensor array 240 that have been "triggered") over a laser cycle (or portion thereof).

The timings and durations of the detection windows can be controlled by a strobe signal (Strobe #i or Strobe<i>). Many repetitions of Strobe #i can be aggregated (e.g., in the pixel) to define a sub-frame for Strobe #i, with subframes i=1 to n defining an image frame. Each sub-frame for Strobe #i can correspond to a respective distance sub-range of the overall imaging distance range. In a single-strobe system, a sub-frame for Strobe #1 can correspond to the overall imaging distance range and is the same as an image frame since there is a single strobe. The time between emitter unit pulses (which defines a laser cycle, or more generally emitter pulse frequency) can be selected to define or can otherwise correspond to the desired overall imaging distance range for the ToF measurement circuit 200. Accordingly, some embodiments described herein can utilize range strobing to activate and deactivate sensors for durations or "detection windows" of time over the laser cycle, at variable delays with respect to the firing of the laser, thus capturing reflected correlated signal photons corresponding to specific distance sub-ranges at each window/frame, e.g., to limit the number of ambient photons acquired in each laser cycle.

The strobing can turn off and on individual photodetectors or groups of photodetectors (e.g., for a pixel), e.g., to save energy during time intervals outside the detection window. For instance, a SPAD or other photodetector can be turned off during idle time, for example after an integration burst of time bins and before a next laser cycle. As another example, SPADs can also be turned off while all or part of a histogram is being read out from non-transitory memory 215. Yet another example is when a counter for a particular time bin reaches the maximum value (also referred to as "bin saturation") for the allocated bits in the histogram stored in non-transitory memory 215. A control circuit can provide a strobe signal to activate a first subset of the sensors while leaving a second subset of the sensors inactive. In addition or alternatively, circuitry associated with a sensor can also be turned off and on as specified times.

2. Detection of Reflected Pulses

The sensors be arranged in a variety of ways for detecting reflected pulses. For example, the sensors can be arranged in an array, and each sensor can include an array of photodetectors (e.g., SPADs). A signal from a photodetector indicates when a photon was detected and potentially how many photons were detected. For example, a SPAD can be a semiconductor photodiode operated with a reverse bias voltage that generates an electric field of a sufficient magnitude that a single charge carrier introduced into the depletion layer of the device can cause a self-sustaining avalanche via impact ionization. The initiating charge carrier can be photo-electrically generated by a single incident photon striking the high field region. The avalanche is quenched by a quench circuit, either actively (e.g., by reducing the bias voltage) or passively (e.g., by using the voltage drop across a serially connected resistor), to allow the device to be "reset" to detect other photons. This single-photon detection mode of operation is often referred to as "Geiger Mode," and an avalanche can produce a current pulse that results in a photon being counted. Other photodetectors can produce an analog signal (in real time) proportional to the number of photons detected. The signals from individual photodetectors can be combined to provide a signal from the sensor, which can be a digital signal. This signal can be used to generate histograms.

2.1. Time-of-Flight Measurements and Detectors

FIG. 3 illustrates the operation of a typical lidar system that can be improved by some embodiments. A laser or other emitter (e.g., within emitter array 230 or emitter array 130) generates a light pulse 310 of short duration. The horizontal axis represents time and the vertical axis represents power. An example laser pulse duration, characterized by the full-width half maximum (FWHM), is a few nanoseconds, with the peak power of a single emitter being around a few watts. Embodiments that use side emitter lasers or fiber lasers can have much higher peak powers, while embodiments with small diameter VCSELs could have peak powers in the tens of milliwatts to hundreds of milliwatts.

A start time 315 for the emission of the pulse does not need to coincide with the leading edge of the pulse. As shown, the leading edge of light pulse 310 can be after the start time 315. One can want the leading edge to differ in situations where different patterns of pulses are transmitted at different times, e.g., for coded pulses. In this example, a single pulse of light is emitted. In some embodiments, a sequence of multiple pulses can be emitted, and the term "pulse train" as used herein refers to either a single pulse or a sequence of pulses.

An optical receiver system (which can include, e.g., sensor array 240 or sensor array 140) can start detecting received light at the same time as the laser is started, i.e., at the start time. In other embodiments, the optical receiver system can start at a later time, which is at a known time after the start time for the pulse. The optical receiver system detects background light 330 initially and after some time detects the laser pulse reflection 320. The optical receiver system can compare the detected light intensity against a threshold to identify the laser pulse reflection 320. Where a sequence of pulses is emitted, the optical receiver system can detect each pulse. The threshold can distinguish the background light 330 from light corresponding to the laser pulse reflection 320.

The time-of-flight 340 is the time difference between the pulse 310 being emitted and the pulse reflection 320 being received. The time difference can be measured by subtracting the emission time of the pulse 310 (e.g., as measured relative to the start time) from a received time of the pulse reflection 320 (e.g., also measured relative to the start time). The distance to the target can be determined as half the product of the time-of-flight and the speed of light. Pulses from the laser device reflect from objects in the scene at different times, depending on start time and distance to the object, and the sensor array detects the pulses of reflected light.

2.2. Histogram Signals from Photodetectors

One mode of operation of a lidar system is time-correlated single photon counting (TCSPC), which is based on counting single photons in a periodic signal. This technique works well for low levels of periodic radiation which is suitable in a lidar system. This time correlated counting can be controlled by a periodic signal, e.g., from timing generator 220.

The frequency of the periodic signal can specify a time resolution within which data values of a signal are measured. For example, one measured value can be obtained for each photosensor per cycle of the periodic signal. In some embodiments, the measurement value can be the number of photodetectors that triggered during that cycle. The time period of the periodic signal corresponds to a time bin, with each cycle being a different time bin.

Figure 4:
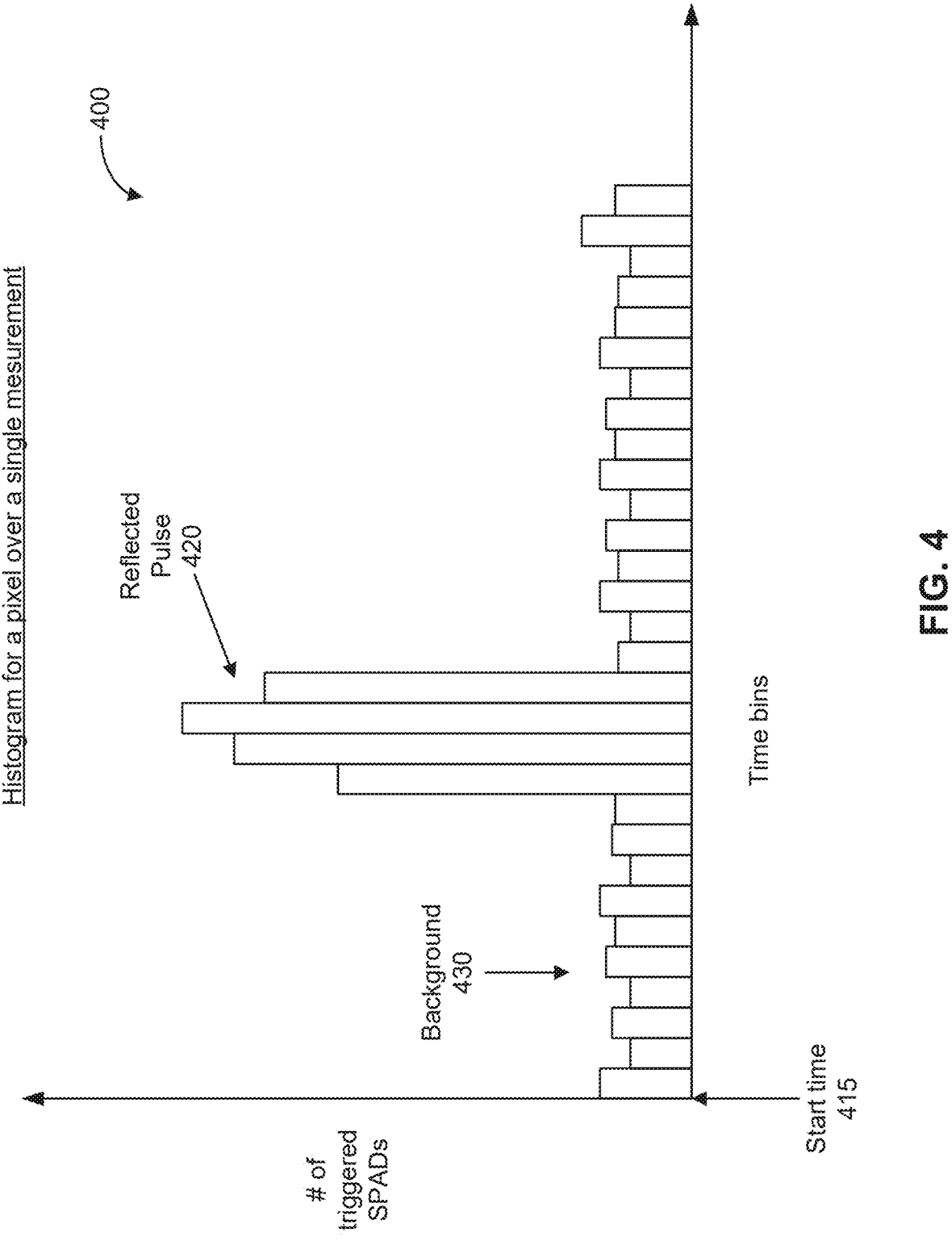
FIG. 4 shows a histogram according to embodiments of the present invention.

FIG. 4 shows a histogram 400 according to some embodiments described herein. The horizontal axis corresponds to time bins as measured relative to start time 415. As described above, start time 415 can correspond to a start time for an emitted pulse train. Any offsets between rising edges of the first pulse of a pulse train and the start time for either or both of a pulse train and a detection time interval can be accounted for when determining the received time to be used for the time-of-flight measurement. In this example, the sensor pixel includes a number of SPADs, and the vertical axis corresponds to the number of triggered SPADs for each time bin. Other types of photodetectors can also be used. For instance, in embodiments where APDs are used as photodetectors, the vertical axis can correspond to an output of an analog-to-digital converter (ADC) that receives the analog signal from an APD. It is noted that APDs and SPADS can both exhibit saturation effects. Where SPADs are used, a saturation effect can lead to dead time for the pixel (e.g., when all SPADs in the pixel are immediately triggered and no SPADs can respond to later-arriving photons). Where APDs are used, saturation can result in a constant maximum signal rather than the dead-time based effects of SPADs. Some effects can occur for both SPADs and APDs, e.g., pulse smearing of very oblique surfaces can occur for both SPADs and APDs.

The counts of triggered SPADs for each of the time bins correspond to the different bars in histogram 400. The counts at the early time bins are relatively low and correspond to background noise 430. At some point, a reflected pulse 420 is detected. The corresponding counts are much larger and can be above a threshold that discriminates between background and a detected pulse. The reflected pulse 420 results in increased counts in four time bins, which might result from a laser pulse of a similar width, e.g., a 4 ns pulse when time bins are each 1 ns.

The temporal location of the time bins corresponding to reflected pulse 420 can be used to determine the received time, e.g., relative to start time 415. In some embodiments, matched filters can be used to identify a pulse pattern, thereby effectively increasing the signal-to-noise ratio and allowing a more accurate determination of the received time. In some embodiments, the accuracy of determining a received time can be less than the time resolution of a single time bin. For instance, for a time bin of 1 ns, a resolution of one time bin would correspond to a distance about 15 cm. However, it can be desirable to have an accuracy of only a few centimeters.

Accordingly, a detected photon can result in a particular time bin of the histogram being incremented based on its time of arrival relative to a start signal, e.g., as indicated by start time 415. The start signal can be periodic such that multiple pulse trains are sent during a measurement. Each start signal can be synchronized to a laser pulse train, with multiple start signals causing multiple pulse trains to be transmitted over multiple laser cycles (also sometimes referred to as "shots"). Thus, a time bin (e.g., from 200 to 201 ns after the start signal) would occur for each detection interval. The histogram can accumulate the counts, with the count of a particular time bin corresponding to a sum of the measured data values all occurring in that particular time bin across multiple shots. When the detected photons are histogrammed based on such a technique, the result can be a return signal having a signal to noise ratio greater than that from a single pulse train by the square root of the number of shots taken.

Figure 5:
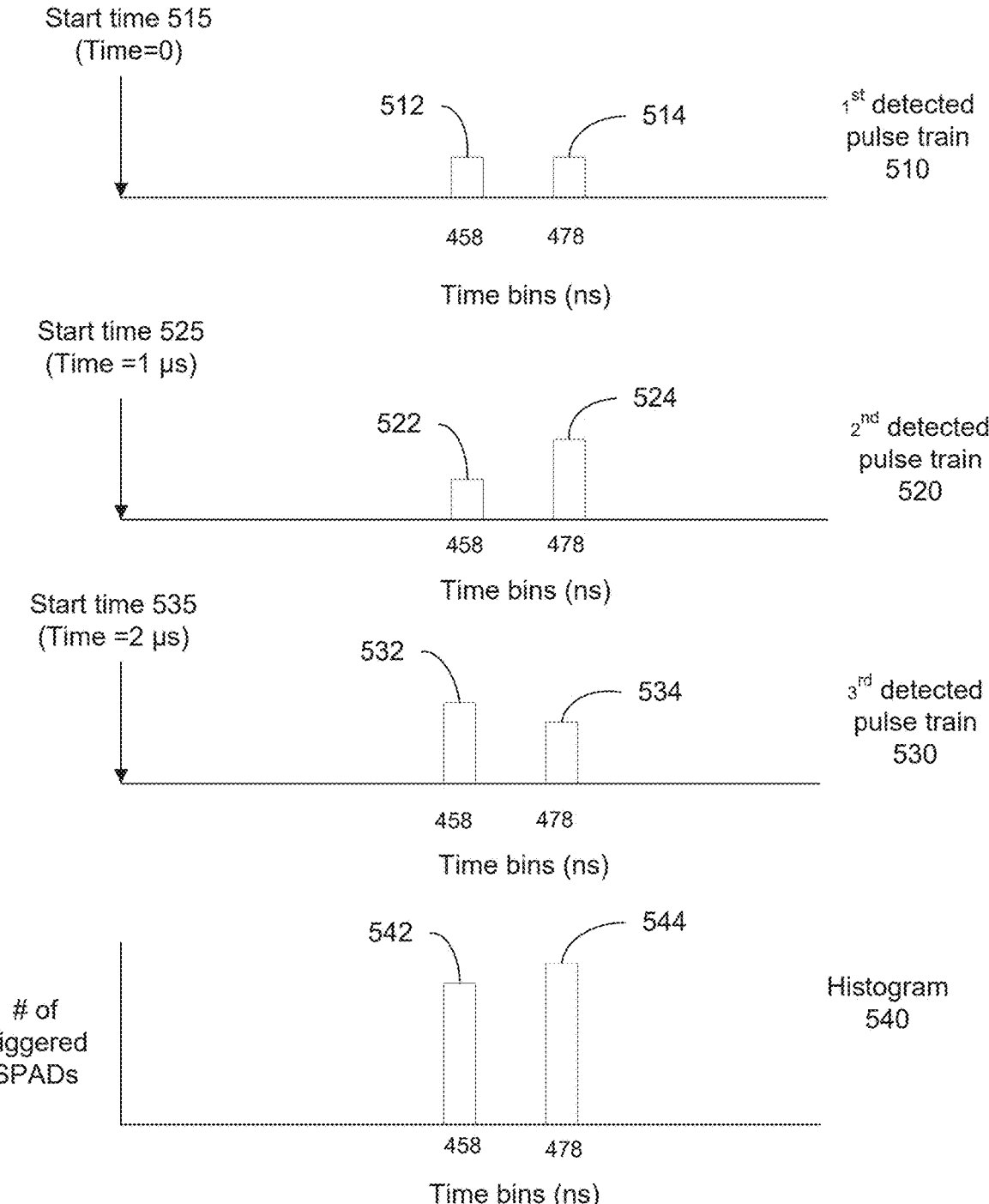
FIG. 5 shows the accumulation of a histogram over multiple pulse trains for a selected pixel according to embodiments of the present invention.

FIG. 5 shows the accumulation of a histogram over multiple pulse trains for a selected pixel according to some embodiments described herein. FIG. 5 shows three detected pulse trains 510, 520 and 530. Each detected pulse train corresponds to a transmitted pulse train that has a same pattern of two pulses separated by a same amount of time. Thus, each detected pulse train has a same pulse pattern, as shown by two time bins having an appreciable value. Counts for other time bins are not shown for simplicity of illustration, although the other time bins can have non-zero values (generally lower than the values in time bins corresponding to detected pulses).

In the first detected pulse train 510, the counts for time bins 512 and 514 are the same. This can result from a same (or approximately the same) number of photodetectors detecting a photon during each of the two time bins, or approximately the same number of photons being detected during the two time bins, depending on the particular photodetectors used. In other embodiments, more than one consecutive time bin can have a non-zero value; but for ease of illustration, individual nonzero time bins have been shown.

Time bins 512 and 514 respectively occur 458 ns and 478 ns after start time 515. The displayed counters for the other detected pulse trains occur at the same time bins relative to their respective start times. In this example, start time 515 is identified as occurring at time 0, but the actual time is arbitrary. The first detection interval for the first detected pulse train can be 1 μs. Thus, the number of time bins measured from start time 515 can be 1,000. After, this first detection interval ends, a new pulse train can be transmitted and detected. The start and end of the different time bins can be controlled by a clock signal, which can be part circuitry that acts as a time-to-digital converter (TDC).

For the second detected pulse train 520, the start time 525 is at 1 μs, at which time the second pulse train can be emitted. Time between start time 515 and start time 525 can be long enough that any pulses transmitted at the beginning of the first detection interval would have already been detected, and thus not cause confusion with pulses detected in the second detection interval. For example, if there is not extra time between shots, then the circuitry could confuse a retroreflective stop sign at 200 m with a much less reflective object at 50 m (assuming a shot period of about 1 μs). The two detection time intervals for pulse trains 510 and 520 can be the same length and have the same relationship to the respective start time. Time bins 522 and 524 occur at the same relative times of 458 ns and 478 ns as time bins 512 and 514. Thus, when the accumulation step occurs, the corresponding counters can be added. For instance, the counter values at time bin 512 and 522 can be accumulated or added together.

For the third detected pulse train 530, the start time 535 is at 2 μs, at which time the third pulse train can be emitted. Time bin 532 and 534 also occur at 458 ns and 478 ns relative to start time 535. The counts for corresponding pulses of different pulse trains can have different values even though the emitted pulses have a same power, e.g., due to the stochastic nature of the scattering process of light pulses off of objects.

Histogram 540 shows an accumulation of the counts from three detected pulse trains 510, 520, 530 at time bins 542 and 544, which also correspond to 458 ns and 478 ns. Histogram 540 can have fewer time bins than were measured during the respective detection intervals, e.g., as a result of dropping time bins in the beginning or the end of the detection interval or time bins having values less than a threshold. In some implementations, about 10-30 time bins can have appreciable values, depending on the pattern for a pulse train.

As examples, the number of pulse trains emitted during a measurement to create a single histogram can be around 1-40 (e.g., 24), but can also be much higher, e.g., 50, 100, 500, or 1000. Once a measurement is completed, the counts for the histogram can be reset, and another set of pulse trains can be emitted to perform a new measurement. In various embodiments and depending on the number of detection intervals in the respective measurement cycles, measurements can be performed, e.g., every 25, 50, 100, or 500 μs. In some embodiments, measurement intervals can overlap, e.g., so that a given histogram corresponds to a particular sliding window of pulse trains. In such an example, memory can be provided for storing multiple histograms, each corresponding to a different time window. Any weights applied to the detected pulses can be the same for each histogram, or such weights could be independently controlled.

3. Pixel Operation

Figure 6:
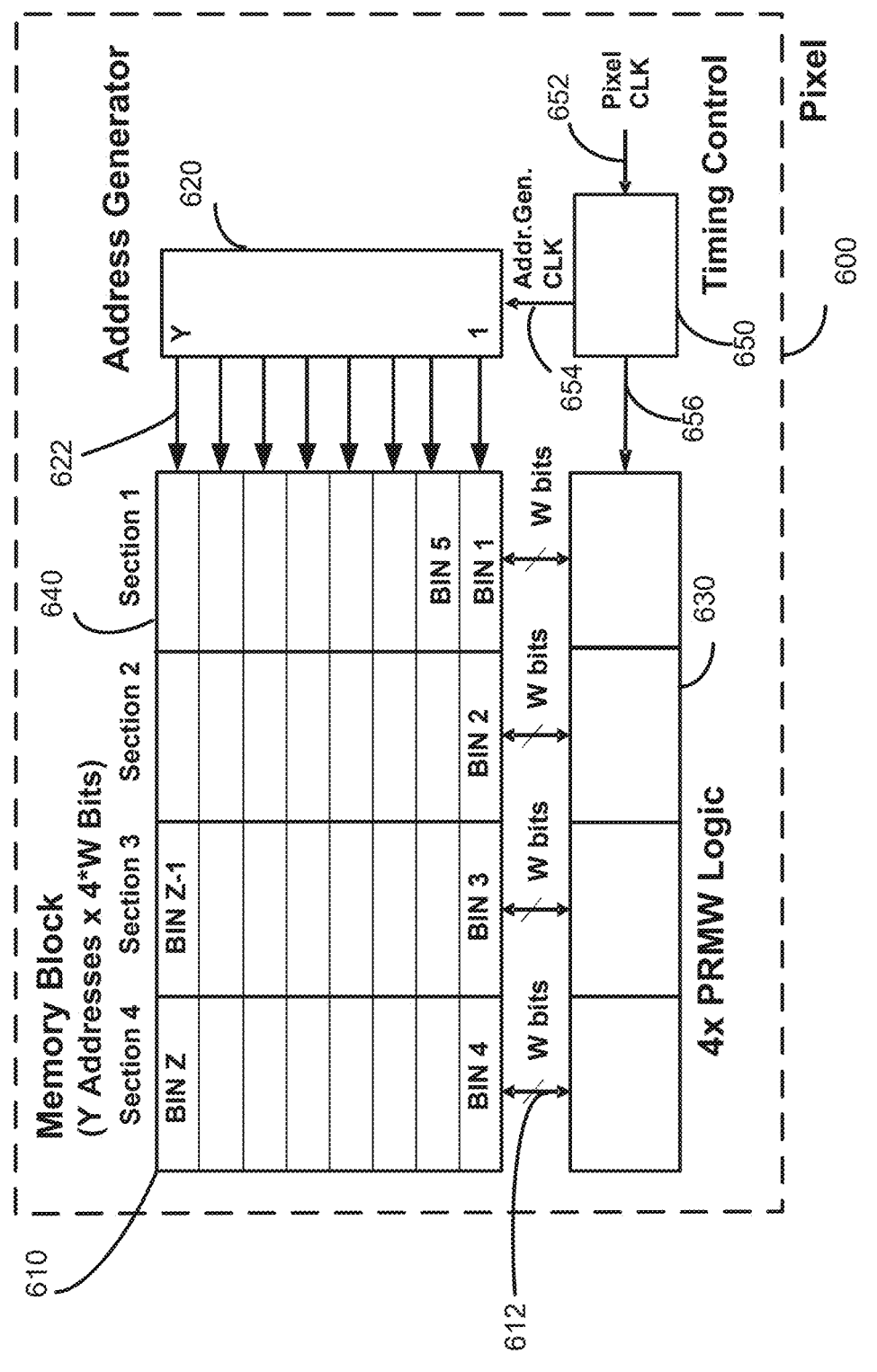
FIG. 6 illustrates an example of a pixel according to an embodiment of the present invention.

In some embodiments of the present invention, detector pixel 600, or more simply pixel 600, can include memory block 610, precharge-read-modify-write (PRMW) logic circuits 630, address generator 620, and timing control circuit 650 (all shown in FIG. 6.) Pixel 600 can include one or more photodetectors, for example the SPAD devices shown below in FIG. 20 and FIG. 21, as well as other circuits or components (not shown.) Pixel 600 can be used as sensor 142 (shown in FIG. 1.)

FIG. 6 illustrates an example of a pixel according to an embodiment of the present invention. Pixel 600 can include an Y×4W memory block 610. Memory block 610 can include an array of memory cells arranged in Y rows and 4W columns, where the 4W columns are arranged as four memory banks 640 or sections, each having W memory cells. As shown in FIG. 6, timing control circuit 650 can receive a pixel clock on line 652. Timing control circuit 650 can provide an address generator clock on line 654 and pre-charge, read, modify, and write signals on lines 656 to PRMW logic circuits 630. Memory block 610 can be addressed using address generator 620 that provides Y row addresses on lines 622. Pixel 600 can include four PRMW logic circuits 630 of W bits each for a total of 4W bits, corresponding to the number of bitlines 612 or columns in memory block 610. In this configuration, four time bins can be stored in each row of memory block 610. In these and other embodiments of the present invention, Y can have a value of 32, 36, 40, 64, or other value, while W can have a value of 8, 10, 12, 16, or other value. Memory block 610 can be divided into two, three, five, or more than five sections with a corresponding number of PRMW logic circuits 630.

Pixels 600 can histogram events detected from one or more SPAD devices (shown in FIG. 21B) following an emitted pulse from emitter array 230 (shown in FIG. 2.) That is, the number of detected events from one or more SPAD devices can be time-sliced into time bins and accumulated in memory block 610. For example, the number of detected SPAD events from four preceding time bins can be stored in a temporary memory in the PRMW logic circuits 630 or other related circuit. Pixel 600 can perform a series of tasks, wherein during a first clock cycle, the PRMW logic circuits 630, under the control of timing control circuit 650, can perform a precharge task, where bitlines 612 for memory block 610 can be precharged. During a second clock cycle, the memory cells in the addressed row can be read by PRMW logic circuits 630. Bin counts stored in the addressed row can be modified by the PRMW logic circuits 630 by adding values from the temporary memory to the read value. The PRMW logic circuits 630 can then perform a write task to write the modified bin counts back to the memory cells for the four time bins in the addressed row in memory block 610. Further details of pixel 600 are described, for example, in U.S. Patent Application Publication No. 63/216,580, entitled "Highly Parallel Large Memory Histogramming Pixel for Direct Time of Flight Lidar," the disclosure of which is incorporated by reference herein in its entirety for all purposes.

While PRMW circuits and techniques can be used consistent with embodiments of the present invention, other pixel architecture can be used. For example, a conventional counter based pixel or other architectures can be employed consistent with embodiments of the present invention.

4. Limiting Photon Count Accumulation by Using Initial Results

An illustrative embodiment of the present invention can save power by limiting received photon accumulation to a range of bins corresponding to a range of distances where a position of an object has been predetermined. By not accumulating or binning photon data over an entire range, the amount of data stored each laser cycle can be reduced, and other power saving measures can be realized. By limiting a range over which photon data is accumulated, the resolution of each bin can be increased, thereby improving a resulting lidar image.

These and other embodiments of the present invention can provide various methods for the position or distance of an object to be predetermined. For one example, a distance to the object can be found by initially accumulating data over an entire range. That is, photon data can be accumulated over an entire range for a first number of cycles. For one or more pixels, a first distance to the object can be determined.

Photon data for the one or more pixels can be then accumulated over a limited range corresponding to the first distance for a second number of cycles. For example, photon data can be collected over a range of pixels starting with a first number of bins before a detected peak and a second number of bins following the detected peak, where the first and second numbers are either the same or different numbers.

Accordingly, it can be desirable to accumulate photon data in a limited number of bins, that is, for a limited distance range. Embodiments of the present invention can provide a lidar system including one or more emitter elements (including one or more light emitting devices or lasers, for example surface- or edge-emitting laser diodes; generally referred to herein as emitters) that output optical signals (referred to herein as emitter signals) in response to emitter control signals, one or more detector elements (including photodetectors, for example photodiodes, including avalanche photodiodes and single-photon avalanche detectors; generally referred to herein as detectors) that output detection signals in response to incident light (also referred to as detection events), and/or one or more control circuits configured to operate using non-transitory memory device to perform operations including using a progressive scan with dynamic histogram bin timing in processing received detection events.

In some embodiments, a frame is divided into multiple subframes associated with a relatively small number of bins, respectively.

In some embodiments, the target range is determined in a generally coarse manner initially with the timing or range associated with each bin becoming finer or more precise with each iteration.

In some embodiments, the range associated with the bin in which a target is detected is then divided over all of the bins in a subsequent iteration. In other words, the boundaries for the subframes are dynamically modified with each iteration to narrow down the location of the target in accordance with the resolution capability of the system.

In some embodiments, the pulse repetition frequency may increase as the binning becomes more refined.

In some embodiments, the range covered in a second subframe may be longer than the bin length of the first subframe to detect targets that may span more than one bin.

In some embodiments, the peak power and/or laser cycles may be tuned, such that the target probability of detection is met at least in the second to last bin of the first subframe.

Some embodiments of the inventive concept may arise from the realization that it is generally desirable to use a single or small number of strobe windows to reduce the total emitter power in generating the emitter pulse signals. If a lidar system is configured, for example, to detect objects at a long range with relatively fine resolution, then many histogram memory bins may be needed. This may result in the use of a relatively large memory bank per pixel, which may result in a large pixel pitch. A larger pitch can require the use of a larger die during fabrication, which can be expensive, as well as larger optics, which may also be expensive. The increased size of a lidar system may be more difficult to integrate into applications, for example automobiles, which may require a smaller form factor.

Some embodiments of the inventive concept may provide a lidar system using a progressive scan with dynamic histogram bin timing rather than allocating a number of bins or subframes based on the ratio of the maximum detection range and the bin range resolution. In terms of the amount of memory required, bins may cost more than counts per bin, as bins may scale linearly while counts per bin may not.

According to some embodiments of the inventive concept, detection is performed using an iterative process. In a first iteration, a target range is determined with a coarser resolution using a relatively small number of bins or subframes. In the following iterations, the bin or subframe timing is adjusted in an increasingly fine or more precise manner based on the bin in which the target was located in the previous iteration. The number of iterations continues until the target distance is identified with the desired resolution.

FIG. 7 illustrates a system 700 for determining a target range based on a distribution of photon counts over a strobe window. As shown in FIG. 7, N bins 710a, 710b, . . . , 710N may be used to collect counts of photons that reflect off of a target in response to emitter pulses generated during a strobe window. Each bin may be allocated a time window or subframe, which corresponds to a particular distance or range for the scan. Based on the histogram of counts, for example, in each bin, the comparator 715 may identify which bin(s) indicate the presence of a target and which bins indicate the presence of background noise. The comparator 715 may output a range detection signal indicating that a target has been identified at a specific range corresponding to the range associated with a particular one of the bins 710a, 710b, . . . , 710N.

Figures 8A, 8B, 8C, 8D:
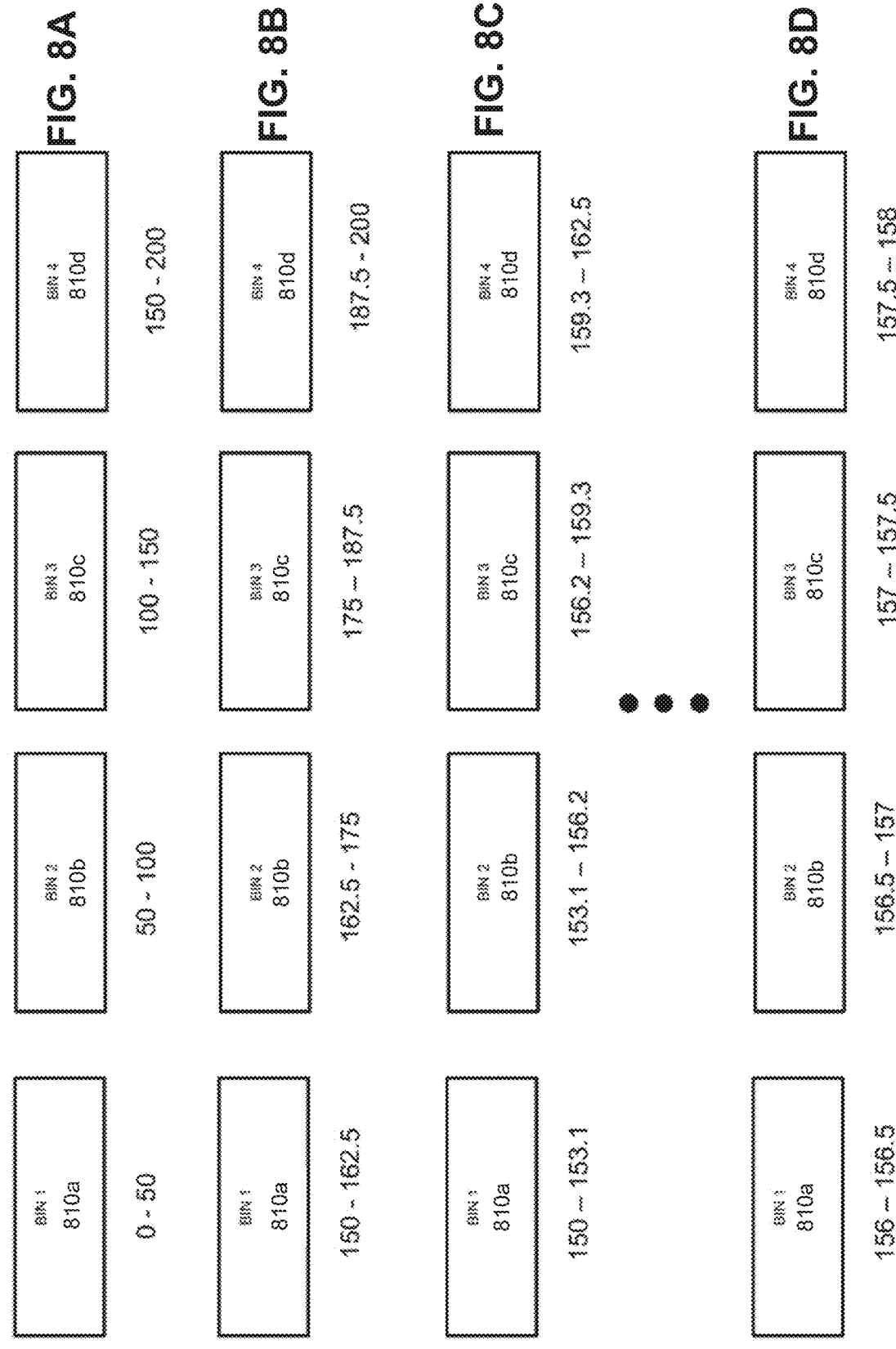
FIGS. 8A-8D illustrate an example of an embodiment of the present invention.

Referring now to FIGS. 8A-8D, embodiments of the inventive concept may be illustrated by way of example. A lidar system operating using a 200 m range with a desired resolution of 50 cm may use four bins 810a, 810b, 810c and 810d. As shown in FIG. 8A, the bins 810a, 810b, 810c and 810d may be divided into four subframe photon arrival time intervals corresponding to a target in the 0-50 m range, 50-100 m range, 100-150 m range, and 150-200 m range. Assuming the target is 157.75 m away from the lidar system, then during a first iteration, i.e., four subframes, the comparator 715 may determine that the target is located in the 150-200 m range based on the photon counts in bin 4 810d. This one iteration, however, only narrows down the location of the target to within a 50 m range, which is far outside the desired resolution of 50 cm. The process may be repeated, however, with the range corresponding to the bin or subframe in which the target was found spread across all four of the bins. Thus, as shown in FIG. 8B, the range from 150-200 m is divided between the four bins 810a, 810b, 810c and 810d in 12.5 m segments. The comparator 715 then determines that the target is in the 150-162.5 m range based on the photon counts in bin 1 810a during the first subframe of the second iteration. Accordingly, the range 150-162.5 m is divided between the four bins 810a, 810b, 810c and 810d in approximately 3.1 m segments as shown in FIG. 8C. The iterative process continues until the desired resolution of 50 cm is reached as shown in FIG. 8D. The comparator 715 then determines that the target is in the 157.5-158 m range based on the photon counts in bin 4 810d. Thus, the resolution after each iteration is R/Ni where R is the total range, N is the number of bins or subframes, and i is the iteration number. By contrast, conventional lidar target detection systems that are configured to operate with a range of 200 m and a resolution of 50 cm may use a number of bins or subframes given by 200 m/0.5 m, which is 400. Thus, the number of bins or subframes may be reduced by two orders of magnitude by using an iterative process based on dynamic bin timing, according to some embodiments of the inventive concept, as illustrated by the above-described example.

Note that the background noise is based on the square root of the bin duration or range and that the signal to noise threshold is based on the square root of the number of measurements or cycles, e.g., strobe windows. In some embodiments, the laser peak power scales down with the square root of each subframe's bin duration. In other embodiments, the laser peak power remains the same, but the number of laser pulses scales with the bin duration. In further embodiments (e.g., in short range lidar, the laser power is maintained and is set to result in an acceptable signal to noise ratio at worst case conditions for the longest range bin detecting the dimmest, most distant target.

In some embodiments, the iterative process may be performed over the entire array by increasing the Pulse Repetition Frequency (PRF) as the binning becomes more refined so that the target returns wrap around the histogram. For example, 20 bins may be used to cover 200 m during the first subframe with a PRF of 750 kHz to ensure minimal or no aliasing. The same 30 bins may then be used to cover 10 m (200 m/20) with a PRF of 7.25 MHz. For each pixel, a coarse location with a resolution of 10 m is obtained during the first subframe, while the fine location is obtained during the second subframe. However, during the second subframe the receiver is agnostic with respect to the position of the targets, i.e., the gates are not specialized to cover a specific 10 m range, conversely all of the 10 m ranges may be covered by overpulsing In some instances, a target may be identified across two bins. In such circumstances, a binning may be used in the second subframe that covers a range longer than the bin length of the first subframe. For example, if 20 bins are used to cover 200 m during the first subframe, the same 20 bins may be used to cover 40 m during the second subframe. If a target was found in bins 3 and 4 during the first subframe, then a return may be present in the first and in the last bin of the second subframe given that the pulse width may match the bin of the second subframe. The range covered by the second subframe does not necessarily have to be a multiple of the bin length of the first subframe, in accordance with various embodiments of the inventive concept, e.g., a distance of 27 m may be chosen.

When using longer bins, e.g., 50 m, the laser pulse may be shorter, which may result in a relatively low signal to background ratio especially at longer ranges. As a result, the target returns may go undetected with expending high power either through peak power or through a large number of cycles. Thus, in some embodiments, the peak power and/or the laser cycles may be tuned such that the target probability of detection is met at least in the second to the last bin of the first subframe. If no returns are detected, it may be assumed that in the second subframe that any detected return belongs to the last bin of the first subframe. Such an approach may improve performance as the signal to background ratio may increase at closer ranges.

Embodiments of the inventive concept are not limited to peak photon interpolation schemes and can work with classical histogramming where the bin width determines the system resolution. Embodiments of the inventive concept are also applicable to peak interpolation techniques for photon processing and analysis. Embodiments of the inventive concept may also apply to short-range lidar, fine-resolution lidar, and to long-range lidar.

Figure 9:
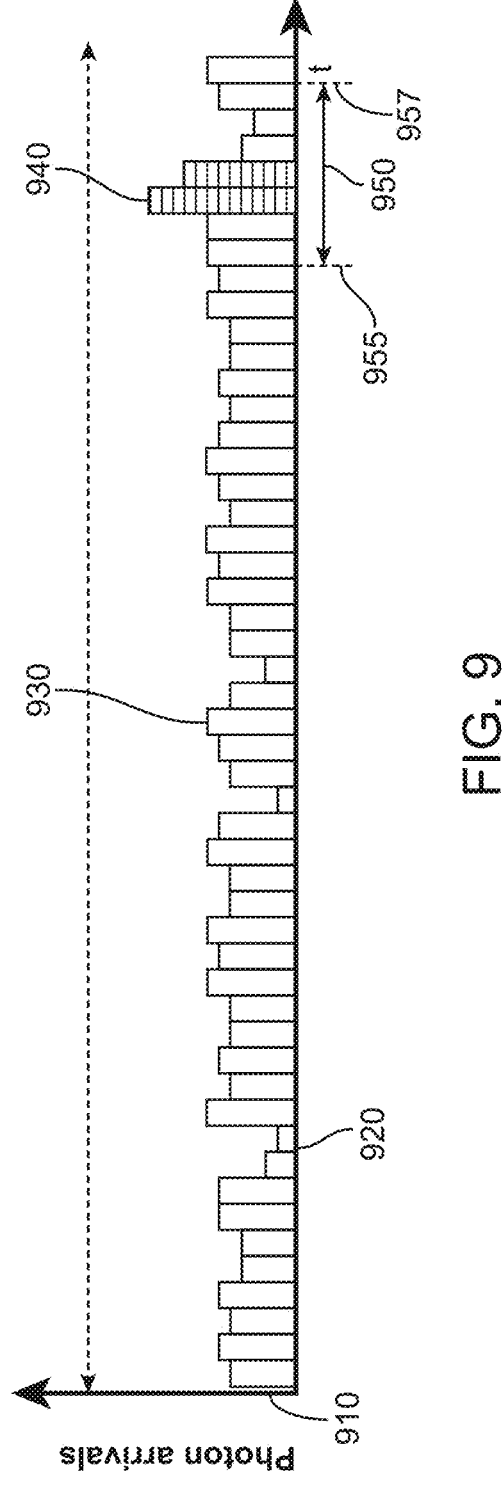
FIG. 9 illustrates photon accumulation over a narrowed range of bins according to an embodiment of the present invention.

FIG. 9 illustrates photon accumulation over a narrowed range of bins according to an embodiment of the present invention. Accumulated photon counts for a pixel are shown along Y-axis 910 as a function of time (or distance) 920. The accumulated counts can be stored in bins 930. A peak 940 can indicate a distance to an object for the pixel. A narrowed window 950 centered at least approximately on peak 940 can be found. During future subframes or numbers of cycles for a frame, photon counts can be accumulated in bins 930 corresponding to window 950, while photon counts are not accumulated in the remaining bins. That is, counting or binning can begin at time (or distance) 955 and end at time (or distance) 957. Since fewer bins are used, the duration of each bin can be reduced and more bins can be used between time 955 and time 957. This can help to increase a resolution of a resulting image. Also, by using only a limited number of bins in each pixel, more efficient use of memory can be achieved. Further, the amount of memory needed for each pixel can be reduced.

In this example, one peak 940 and one narrowed window 950 are shown. In these and other embodiments of the present invention, more than one peak 940 can be detected in the accumulated photon counts for a pixel. For example, two, three, or more than three peaks 940 corresponding to detected objects can be found. Corresponding windows 950, one for each detected peak 940, can be determined. During future subframes or numbers of cycles for a frame, photon counts can be accumulated in bins 930 corresponding to each of these windows 950, while photon counts are not accumulated in the remaining bins.

In the above example, a first approximation for a distance to an object for a pixel can be found by accumulating photon counts over an entire range of distance for the lidar system. In these and other embodiments of the present invention, a system external or incorporated in the lidar can be used to find a first approximation for a distance to an object for a pixel. An example is shown in the following figure.

Figure 10:
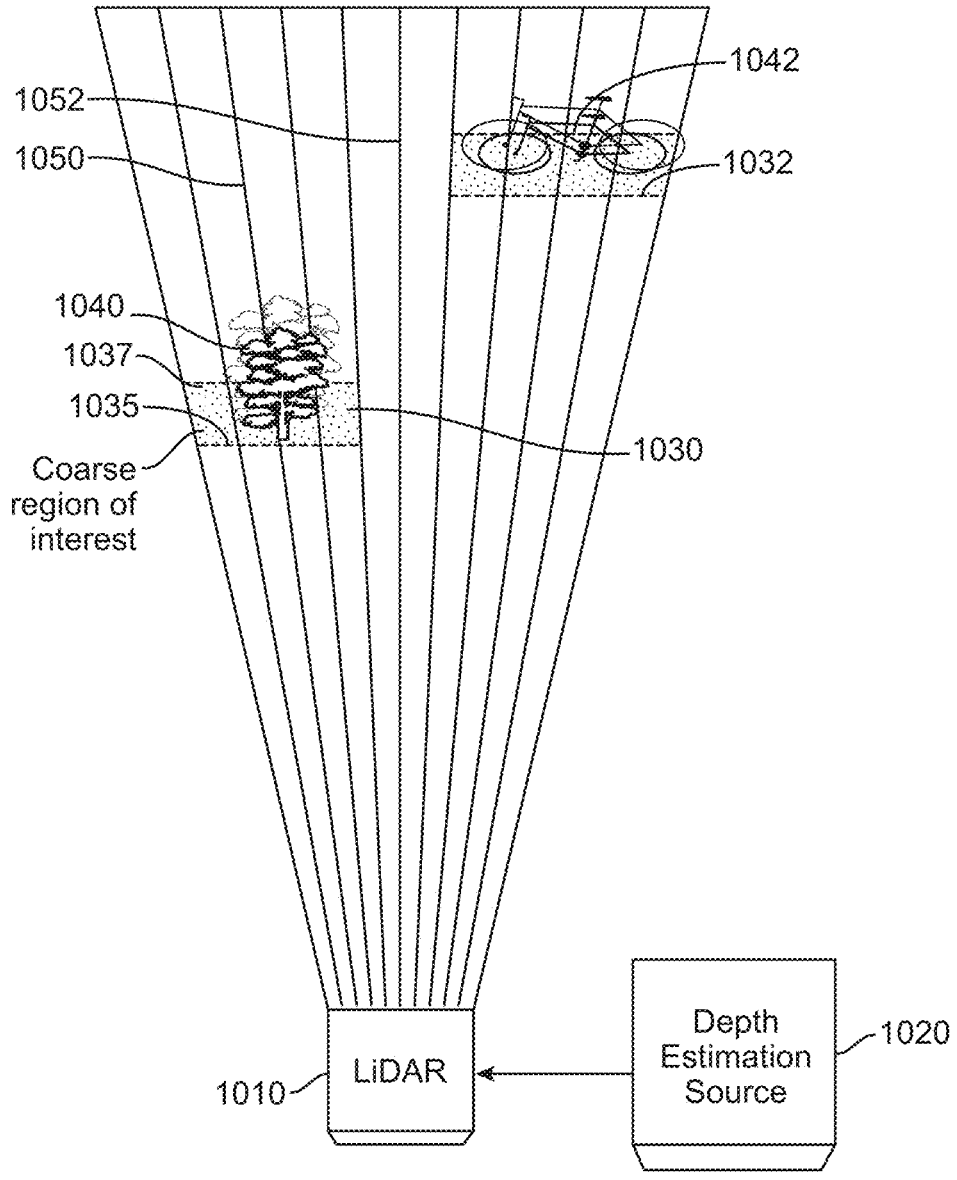
FIG. 10 illustrates a lidar system accumulating photon counts over a narrowed range of bins according to an embodiment of the present invention.

FIG. 10 illustrates a lidar system accumulating photon counts over a narrowed range of bins according to an embodiment of the present invention. Depth estimation source 1020 can provide depth information for pixels of lidar system 1010. Depth estimation source 1020 can identify ranges 1030 and 1032 where photon counts should be accumulated by corresponding pixels in lidar system 1010. Ranges 1030 and 1032 can be determined based on the position or distance of object 1040 (tree) and object 1042 (bicycle.) For example, a pixel (not shown) corresponding to beam 1050 can count photons during bins that correspond to a front 1035 and back 1037 of range 1030.

In this example, for the pixel corresponding to beam 1050, photon counting can begin at front 1035 of range 1030. This can correspond to the bin at time 955 as shown in FIG. 9. Photon counting can continue until light returns from the back 1037 of range 1030, which can correspond to the bin at time 957 as shown in FIG. 9.

In these and other embodiments of the present invention, depth estimation source 1020 can provide depth information for pixels of lidar system 1010 at the start of every frame. That is, depth information can be provided on a pixel-by-pixel basis to the pixels of lidar system 1010 by depth estimation source 1020. To simplify this task, some frames can instead rely on information gathered by one or more previous frames. For example, narrowed bin ranges from a frame can be used to set ranges for a subsequent frame. Tracking and predictive information can be used as well. For example, tracking and predictive information can be used in FIG. 10 to move narrowed range 1032 closer to lidar system 1010 if object 1042 is expected to move closer to lidar system 1010. Also, beam 1052 can be activated and the corresponding pixel in lidar system 1010 can turn on and count pixels in bins from time 955 to 957 if object 1042 if expected to move the left. To avoid missing an object that might make a sudden appearance, information from depth estimation source 1020 can be used to reset the various narrowed bin ranges for each pixel in lidar system 1010.

In this example, there are no objects in the path of beam 1052. Any photons counted by the corresponding pixel would indicate background noise and would not provide useful information. Accordingly, embodiments of the present invention can prevent any counting of photons by the pixel corresponding to beam 1052. To further reduce power dissipation, the emitter corresponding to beam 1052 can be turned off such that beam 1052 is not generated. In these and other embodiments of the present invention, power can be reduced for emitters providing beams 1050 that detect nearby items for example object 1040. Emitter power can be adjusted on an emitter-by-emitter basis, where emitters corresponding to pixels providing beams 1050 are operated at a lower power and emitters corresponding to pixels providing beams 1052 are turned off or operated at low or zero power.

In these and other embodiments of the present invention, depth estimation source 1020 and lidar system 1010 can be separate units. Alternatively, depth estimation source 1020 and lidar system 1010 can be included in a combined electronic device. Alternatively, another electronic device or component (not shown), for example a computing device or microprocessor-based device, can be included as a separate component, or included as part of depth estimation source 1020, lidar system 1010, or a combined device that includes depth estimation source 1020 and lidar system 1010.

5. Using a Stereo Camera to Determine Coarse Depth Range

In another example, data provided by a second system can be used to generate a first approximation of a distance to an object. This second system can be physically separate from or combined as part of the lidar system. As an example, a stereo camera can be coupled to, or included as part of, a lidar system. The stereo camera can acquire a pair of images offset by a spacing, and from the pair of images can generate stereo depth estimates. The depth estimates can be mapped to corresponding lidar pixels. The depth estimates can be converted to time intervals, which can be provided to the lidar system. The lidar system can use this to narrow the range over which photon data is collected for one or more pixels.

Solid-state flash lidar solves many challenges in conventional scanning lidar for example frame rate limitations, commercial scalability, and point occlusions from dust/fog particles. This makes it an ideal solution for short range indoor applications. However, two critical challenges remain for long range outdoor applications high laser power consumption and data volume. Accordingly, embodiments of the present invention can provide guided flash lidar, which can use a lidar system in which each pixel can be separately "guided" to a coarse time window of interest by external sources, as illustrated in FIG. 9 and FIG. 10. This allows each pixel to optimize the collection of returning laser photons without adopting partial histogram approaches such as zooming or sliding, which can lead to multiple orders of additional laser power.

Various sensors can be used in a lidar system. One example contains 64×32 macro pixels, each with 4×4 SPAD pixels, alongside photon event timing and storage of 8×12 bit time bin intervals. A function of this sensor allows each pixel to independently scan through time windows until a target is detected. In these and other embodiments of the present invention, the sensor can be reengineered to allow pixel time windows to be externally configured and continuously updated. Stereo depth can be computed by matching corresponding points between left and right images using the semi global matching algorithm to estimate pixel disparity. In these and other embodiments of the present invention, estimates can be provided from a variety of sources including single camera (monocular vision), radar, or previous frame data.

In one example, a time bin and window step size can be 2.5 ns (0.375 m) and 12.5 ns (1.875 m). The combined precision and accuracy evaluated by ranging a target at 45 different points (3×3 pixels and 5 frames) at regular distance intervals can be within 10 cm at 25 m. An equivalent 8 bin sliding partial histogram approach would require over 10× sliding steps per frame and consume the same amount in additional laser power, while a full histogram approach would require 8× more in pixel capacity. Another benefit of guided flash lidar mitigating multipath reflections can be where the sensor is correctly guided to an object beyond a glass door, which would otherwise be missed using a first peak approach.

Figure 11:
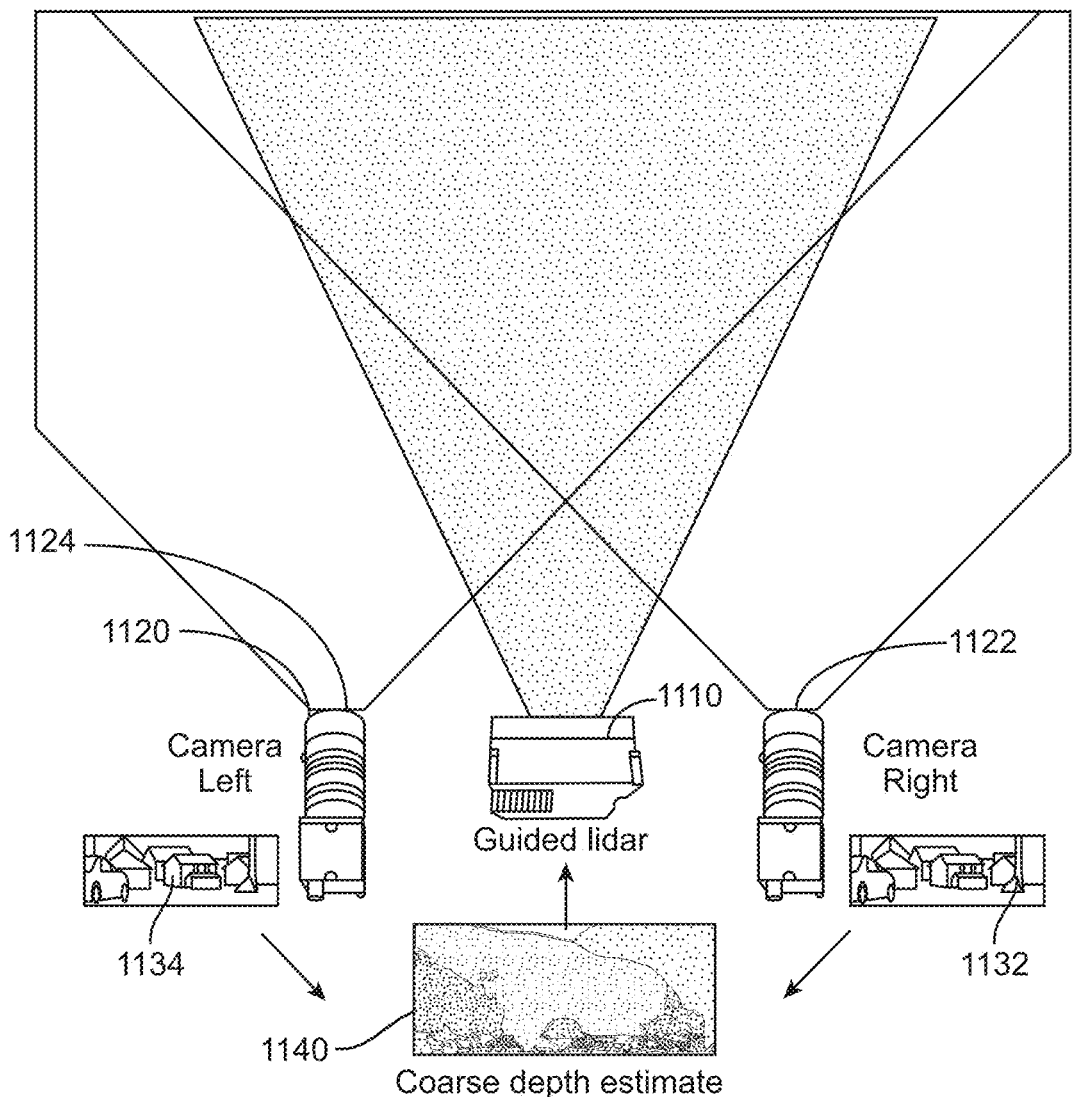
FIG. 11 illustrates a stereo camera operating with a lidar system according to an embodiment of the present invention.

FIG. 11 illustrates a stereo camera operating with a lidar system according to an embodiment of the present invention. Stereo camera 1120 can include right camera 1122 and left camera 1124. Right camera 1122 and left camera 1124 can be fixed in position relative to each other. Stereo camera 1120 can be in communication with lidar system 1110. Image 1132 can be generated by right camera 1122 and image 1134 can be generated by left camera 1124. Image 1132 and image 1134 can be combined to generate coarse depth estimate 1140. Range information can be extracted from the coarse depth estimate 1140 by either stereo camera 1120 or lidar system 1110. This range information can include the identities of starting and stopping bins, for example the start bin at time 955 and the stop bin at time 957, as shown in FIG. 9, for one or more pixels in lidar system 1110. An example is shown in FIG. 12.

In these and other embodiments of the present invention, stereo camera 1120 and lidar system 1110 can be separate units. Alternatively, stereo camera 1120 and lidar system 1110 can be included in a combined electronic device. Alternatively, another electronic device or component (not shown), for example a computing device or microprocessor-based device, can be included as a separate component, or included as part of stereo camera 1120, lidar system 1110, or a combined device that includes stereo camera 1120 and lidar system 1110. Right camera 1122 and left camera 1124 can be included in a single unit, or right camera 1122 and left camera 1124 can be separate units. Either or both right camera 1122 and left camera 1124 can be combined with lidar system 1110 as a single unit. Either or both right camera 1122 and left camera 1124 can include RGB sensors, lidar sensors, filters, and other types of components. An example of RGB sensors having various filters and other components and located in lidar systems can be found in U.S. Pat. No. 10,809,380, titled AUGMENTING PANORAMIC LIDAR RESULTS WITH COLOR, which is incorporated by reference.

Figure 12:
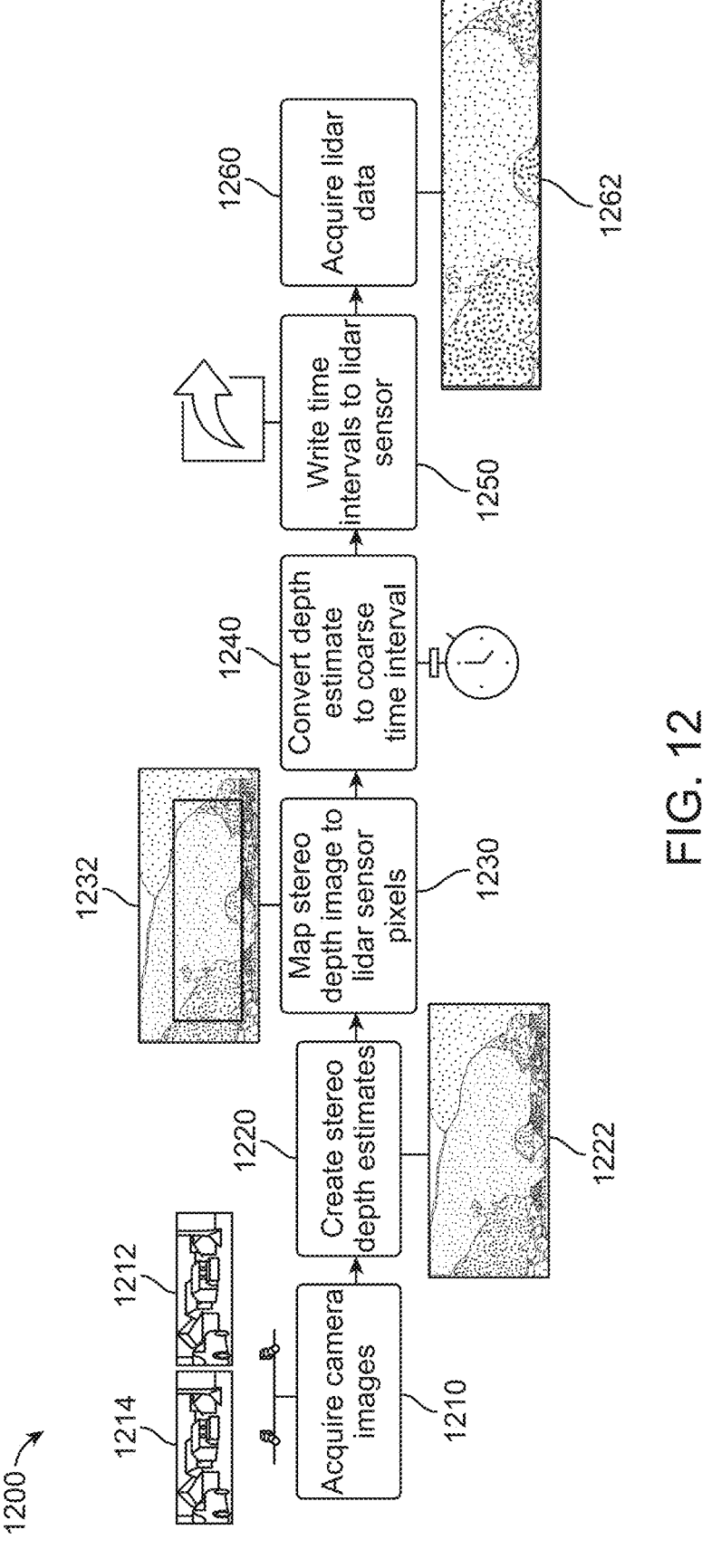
FIG. 12 illustrates a method of operating a stereo camera and a lidar system according to an embodiment of the present invention.

FIG. 12 illustrates a method of operating a stereo camera and a lidar system according to an embodiment of the present invention. Method 1200 includes acquiring right camera image 1212 and left camera image 1214 in act 1210. In act 1220, stereo depth estimates 1222 can be generated in act 1220. This can be done using semi-global matching or other techniques. In act 1230, stereo depth estimates 1222 can be mapped to lidar pixel sensors. This mapping is illustrated here as mapped image 1232. From this mapping, stereo depth estimates 1222 can be converted to coarse time intervals in act 1240. Resulting time intervals, corresponding to start bin (or time) 955 and stop bin (or time) 957 (shown in FIG. 9) can be provided to lidar sensor in act 1250. In act 1260, a lidar image 1262 can be acquired.

In this and other embodiments of the present invention, these various acts, for example generating stereo depth estimates 1222 in act 1220, mapping the stereo depth estimates 1222 to lidar data in act 1230, converting stereo depth estimates 1222 to coarse time intervals in act 1240, can be performed by either or both stereo camera 1120 or lidar system 1010 (both shown in FIG. 11) or another electronic device (not shown), or a combination thereof.

While two cameras are shown here, in these and other embodiments of the present invention, one, three, four, or more than four cameras can operate to provide an increase in the maximum depth range.

In some circumstances, environmental conditions might be such that there is not enough light to operate stereo camera 1120 properly. In these cases, the presence of a limited amount of ambient light can improve the performance of lidar system 1010 and can allowed lidar system 1010 to operate at a reduced power.

6. Using Other Second Systems to Determine Coarse Depth Range

In these and other embodiments of the present invention, other second systems can be used to provide coarse time intervals, for example time interval 950 (shown in FIG. 9.) For example, a vehicle can include adaptive cruise control, blind spot warnings, optical cameras, and other driver assist and safety systems. These and other systems can provide distance values to a lidar system according to embodiments of the present invention.

An example of a vehicle that includes multiple second systems that can work with a lidar system is shown in the following figure.

FIG. 13 illustrates a system that includes a number of second systems that can provide distance information to a lidar system according to an embodiment of the present invention. Vehicle 1300 can include adaptive cruise control system 1310. Adaptive cruise control system 1310 can be a long-range radar. Adaptive cruise control system 1310 can use radar, laser, or camera 1320, or other systems to detect an approximate distance to a leading vehicle. This distance can be converted to time intervals and provided to lidar system 1330. Adaptive cruise control system 1310 can further detect a direction to the leading vehicle. This information can be mapped to corresponding lidar pixels by either the adaptive cruise control system 1310 or lidar system 1330. Lidar system 1330 can then collect photon data for one or more pixels over a narrowed range corresponding to the time intervals provided by adaptive cruise control system 1310. The mapping and time interval generation can be done by either or both adaptive cruise control system 1310 or lidar system 1330, or another electronic device or system (not shown), or a combination thereof.

In these and other embodiments of the present invention, adaptive cruise control system 1310 and lidar system 1330 can be separate units. Alternatively, adaptive cruise control system 1310 and lidar system 1330 can be included in a combined electronic device. Alternatively, another electronic device or component (not shown), for example a computing device or microprocessor-based device, can be included as a separate component, or included as part of adaptive cruise control system 1310, lidar system 1330, or a combined device that includes adaptive cruise control system 1310 and lidar system 1330.

The adaptive cruise control system 1310 can detect changes in relative velocities among vehicles. This change in relative velocity can be used in a predictive manner to move a range where photon counts are to be captured for one or more pixels. This can be particularly useful in reducing lag-times or delays that can be caused by generating initial narrowed bin ranges to be used for each pixel. To avoid missing objects that make a sudden appearance, a reset and reinitialization of the narrowed bin ranges can be run.

In these and other embodiments of the present invention, a frame can be comprised of multiple subframes, where each subframe includes photon count data from one or more cycles, where each cycle includes a firing of the emitters in the emitter array and photon capture by the pixels in lidar system 1330. In some circumstances, it can be difficult to accurately combine multiple subframes into a single frame to form an image. This difficulty can arise primarily due to motion of lidar system 1330 during photon count accumulation. To more accurately compensate for this motion, information from adaptive cruise control system 1310 or other system can be used to determine the motion that took place during image capture. Lidar system 1330 can then use this information to more accurately construct a frame from a number of subframes.

Blind-spot warning system 1340 can use cameras, ultrasonics, short range radar, or other systems to determine that an object, for example a second vehicle (not shown), is within a certain distance in a particular direction. The distance information can be converted to a time interval or maximum time and provided to the lidar system. The direction information can be mapped to corresponding lidar pixels by either the blind-spot warning system 1340 or lidar system 1330. Lidar system 1330 can then collect photon data for one or more pixels over a narrowed range corresponding to the time intervals provided by blind-spot warning system 1340. The mapping and time interval generation can be done by either or both blind-spot warning system 1340 or lidar system 1330, or another electronic device or system (not shown), or a combination thereof.

In these and other embodiments of the present invention, blind-spot warning system 1340 and lidar system 1330 can be separate units. Alternatively, blind-spot warning system 1340 and lidar system 1330 can be included in a combined electronic device. Alternatively, another electronic device or component (not shown), for example a computing device or microprocessor-based device, can be included as a separate component, or included as part of blind-spot warning system 1340, lidar system 1330, or a combined device that includes blind-spot warning system 1340 and lidar system 1330.

A lane assist or lane departure warning system (not shown) can use cameras 1320, infrared sensor, laser, or other systems to determine a position of a lane. The position information can include distance and position information. The distance information can be converted to a time interval or maximum time and provided to the lidar system. The direction information can be mapped to corresponding lidar pixels by either the lane assist or lane departure warning system or the lidar. The lidar system can then collect photon data for one or more pixels over a narrowed range corresponding to the time intervals provided by the lane assist or lane departure warning system. The mapping and time interval generation can be done by either or both a lane assist or lane departure warning system or lidar system 1330, or another electronic device or system (not shown), or a combination thereof.

In these and other embodiments of the present invention, the lane assist or lane departure warning system and lidar system 1330 can be separate units. Alternatively, the lane assist or lane departure warning system and lidar system 1330 can be included in a combined electronic device. Alternatively, another electronic device or component (not shown), for example a computing device or microprocessor-based device, can be included as a separate component, or included as part of the lane assist or lane departure warning system, lidar system 1330, or a combined device that includes the lane assist or lane departure warning system and lidar system 1330.

Other systems, for example articulating radars 1350 and other systems employed in autonomous or semi-autonomous driving can be included on vehicle 1300 and can be included and can assist lidar system 1330 in efficiently generating a lidar image. For example, infrared sensors can be included at various locations on a vehicle to help prevent accidents. Ultrasound or ultrasonic systems can be used. These infrared, ultrasonic, and other sensors can provide capture range information for pixels of an associated lidar system.

These various systems can provide distance (or time) and position (or corresponding pixel) information to a lidar system. The lidar system can then narrow the range over which photon data is accumulated. This can help to reduce power in several ways. For example, by storing less photon data for a number of cycles, power can be reduced. Where a distance to an object for one or more pixels is further than a range of the lidar system, corresponding emitters can be prevented from firing and no photon data is accumulated, further saving power. Where a distance to an object for one or more pixels is nearby, emitter power can be reduced and photon data accumulation can be limited to bins corresponding to a short time-of-flight. A sensitivity of SPADs corresponding to one or more pixels can be adjusted to compensate for reduced emitter power when objects are nearby. For example, different numbers of SPADs can be activated for the various pixels. Also or instead, SPAD biasing can be varied and optimized for each pixel.

Information from these second systems can be used in other ways as well. For example, when data is accumulated for a shorter duration, bin size can be decreased leading to a greater image resolution. That is, a number of bins between start bin (or time) 955 and stop bin (or time) 957 (shown in FIG. 9) can be increased. As another example, relative speed data from an adaptive cruise control system can be used to combine cycles or subframes in an accurate manner.

In these and other embodiments of the present invention, lidar system 1330 and the adaptive cruise control system 1310, cameras 1320, blind-spot warning system 1340, and others, can be separate units. Alternatively, lidar system 1110 can be included in a combined electronic device with one or more of these or other devices or systems. Alternatively, another electronic device or component (not shown), for example a computing device or microprocessor-based device, can be included as a separate component, or included as part lidar system 1110 or one or more of the other included devices or systems.

7. Various Applications for Combined Lidar System and Second System

These and other embodiments of the present invention can be used in a variety of settings. For example, a stereo camera and a lidar system can be included on vehicle 1300 (shown in FIG. 13), which can be an autonomous vehicle, partially autonomous vehicle, or other type of vehicle.

In these and other embodiments of the present invention, a stereo camera and a lidar system can be included on a stationary device, where the stationary device can be used for security, traffic or personnel management, toll booths, parking meters, and other purposes. For example, a stationary device supporting a stereo camera and a lidar system can be placed at an intersection. Traffic flow at the intersection can then be monitored. Based on this monitoring, timing adjustments to traffic lights can be made, warnings can be given, or other aspects of the intersection can be controlled.

As an example, a low-power security device can include a stereo camera. The stereo camera can capture images on a periodic basis. When depth information for an image changes as compared to a previous image, the lidar can be activated. Lidar images can then be captured in a method consistent with an embodiment of the present invention. This can allow the detection of possible intruders using a low-power system.

As another example, a lidar system according to an embodiment of the present invention can be placed at various locations in warehouses, construction sites, and other public, semi-public, or private areas. These lidar systems can be used to prevent theft, they can be used for safety, and they can be used for other reasons. For example, a lidar system can be utilized in zone monitoring. A lidar system can be located in a warehouse or other structure near a stairwell or other area or region that people can access but might be dangerous for equipment such as forklifts. The lidar system can be used to detect objects near the stairwell. If the lidar detects an object and determines that the object can be a human figure, then no alarm needs to be raised. When the lidar detects an object and determines that it is much larger and might be a forklift or other machinery, then an alarm can be raised. This can alert an operator that the forklift or other machinery is in a potentially hazardous area.

As another example, a lidar system according to an embodiment of the present invention can be placed either on a surface or structure of a warehouse or other structure. As an example, the lidar system can be placed on a ceiling beam. When a pallet being carried by a forklift or other machine comes near the lidar system, an alarm can be raised thereby warning an operator of a potential collision.

As another example, a lidar system according to an embodiment of the present invention can be placed on a forklift or other machine operating in a warehouse or other structure. As an example, the lidar system can be placed on a forklift or other machine. When the forklift or other machine comes near a structure in the warehouse, an alarm can be raised thereby warning an operator of a potential collision. While forklifts in a warehouse are used in these examples, these examples, and the other examples herein, are not limiting. For example, lidar systems according to an embodiment of the present invention can be used in factories, waste management facilities, construction sites, hangers, airstrips, farms, and other locations. The machines can include drones, garbage trucks and other types of trucks, airplanes, cranes, tractors, backhoes, skid-steers, loaders, and other types of machines.

A stereo camera and a lidar system according to an embodiment of the present invention can be included in an electronic device, for example a wearable computing device, smart phone, or other electronic device. For example, a smart phone, tablet, portable computing device, or other type of device can include two or more cameras and a lidar system. Two of the one or more cameras can be used together to form a stereo camera. Since the cameras likely have different f-stops, compensation for one or both of the cameras can be used to form a stereo camera. The stereo camera can then provide stereo depth estimates to the lidar. The lidar system can then collect photon data for one or more pixels over a narrowed range corresponding to the time intervals provided by the stereo camera. The mapping and time interval generation can be done by either or both the stereo camera or lidar system, or another circuit or component in the smart phone, or a combination thereof. When a greater separation of the two cameras than is achievable in a single device is not possible, cameras in two or more smart phones can operate together over a wired or wireless link to provide depth information.

8. Using a Second Lidar System to Improve Depth Range

Solid-state lidar cameras produce 3D images useful in applications such as robotics and self-driving vehicles. However, range is limited by the lidar laser power and features such as perpendicular surfaces and dark objects pose difficulties. Accordingly, embodiments of the present invention use intensity data, inherent in lidar camera images, to extract additional depth information and boost ranging performance. Using a pair of lidar cameras and a stereo depth algorithm, the native lidar maximum depth range can be increased by 2× in an indoor environment and almost 10× outdoors. Depth information can also be extracted from features in the environment such as dark objects, floors and ceiling which are otherwise missed by the lidar sensor. While the specific technique presented is useful in application involving multiple lidar cameras, the principle of extracting depth data from lidar camera intensity images can also be extended to standalone lidar cameras using monocular depth techniques.

Figure 14:
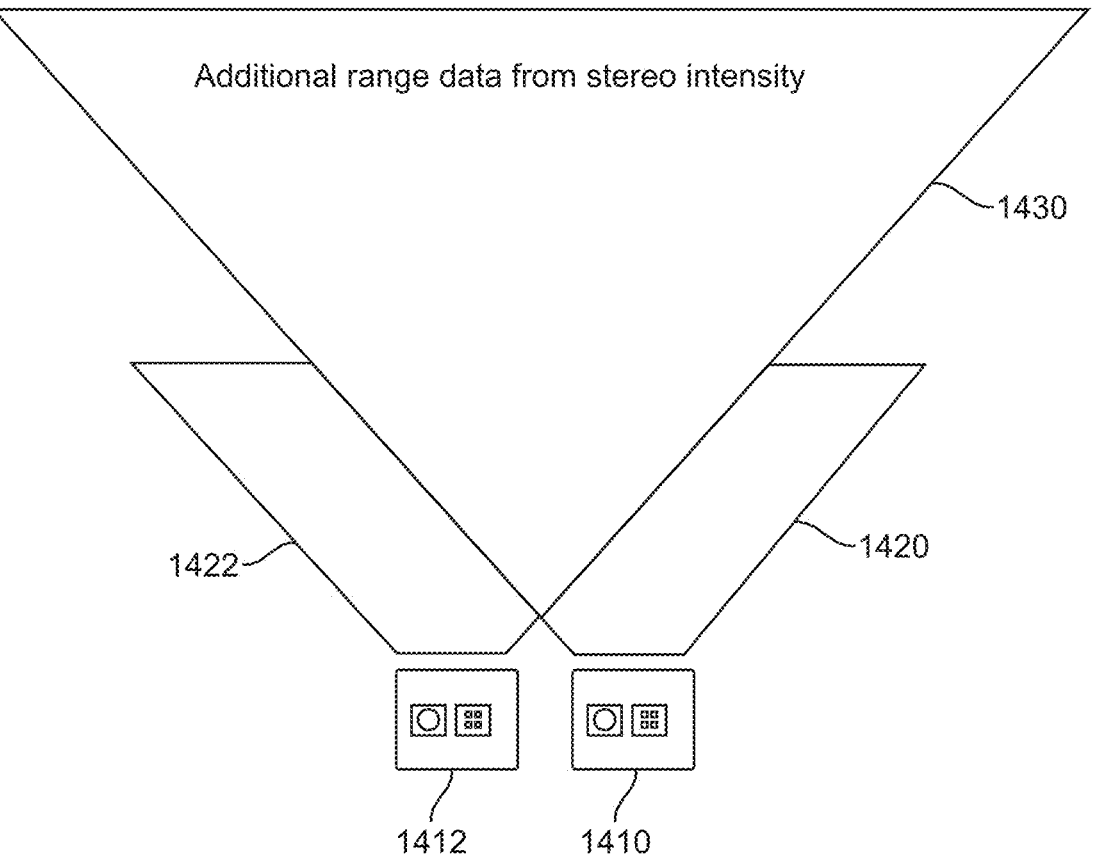
FIG. 14 illustrates an operation of a stereo lidar system according to an embodiment of the present invention.

FIG. 14 illustrates an operation of a stereo lidar system according to an embodiment of the present invention. Right lidar system 1410 would normally have range 1420, while left lidar system 1412 would normally have range 1422. By combining right lidar system 1410 with left lidar system 1412 in a manner provided by an embodiment of the present invention, the range can be extended to range 1430 as shown.

In these and other embodiments of the present invention, right lidar system 1410 and left lidar system 1412 can be separate units. Alternatively, right lidar system 1410 and left lidar system 1412 can be included in a combined electronic device. Alternatively, another electronic device or component (not shown), for example a computing device or microprocessor-based device, can be included as a separate component, or included as part of right lidar system 1410, left lidar system 1412, or a combined device that includes right lidar system 1410 and left lidar system 1412.

Figure 15:
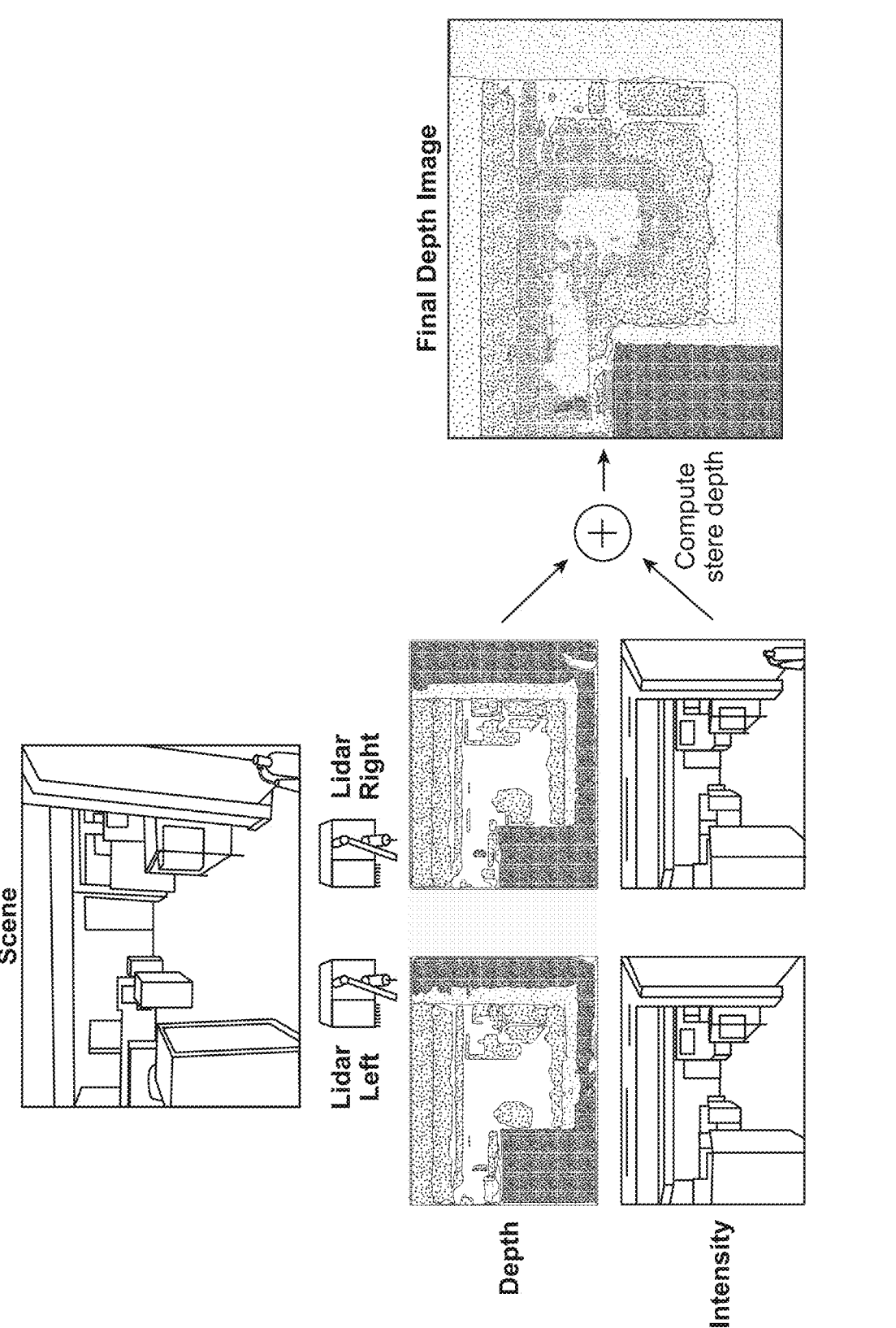
FIG. 15 illustrates a generation of an image having improved depth information according to an embodiment of the present invention.

An often neglected, yet useful image also captured by lidar sensors is an intensity image, given by the total amount of light captured at each point in the scene. Intensity images can uncover details in the image not captured by the depth image alone. Embodiments of the present invention can use inherent lidar intensity images to extract additional depth information. This enables an increase in the maximum achievable lidar depth range with no or limited additional power consumption or hardware modification. Additional depth data on objects which pose challenging to lidar ranging such as perpendicular or dark surfaces can also be extracted. The method implemented in embodiments of the present invention can use a pair of short-range lidar cameras to compute stereo depth from combined intensity images, as shown in FIG. 15.

By using a pair of vision cameras and identifying the pixel displacement $\Delta p$ of common points between both camera images, the distance to each point can be determined. For a camera baseline separation B and focal length f, the distance is given by equation (1): $d=f\times B/\Delta p$.

Figure 16:
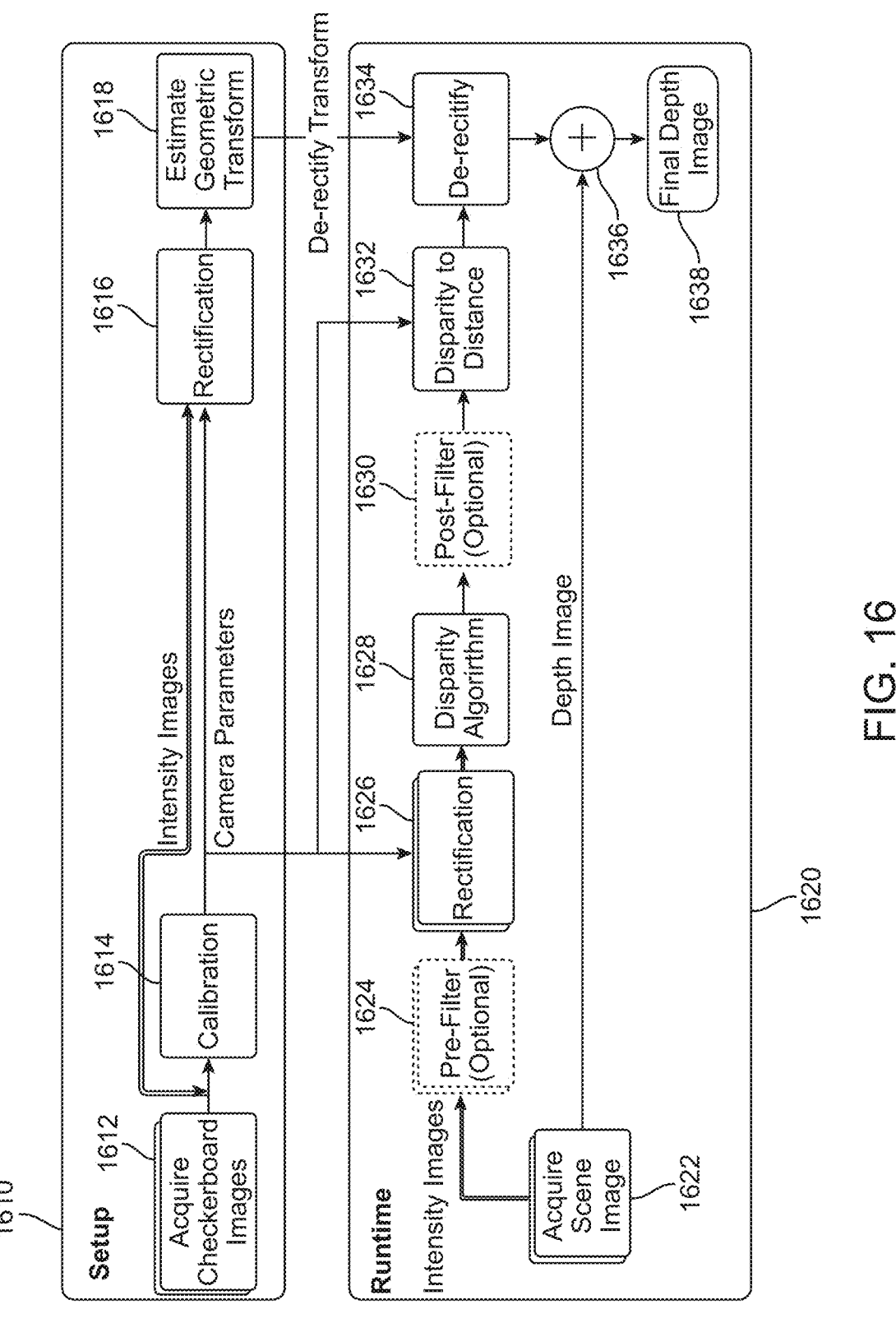
FIG. 16 illustrates a method of generating an image having improved depth information according to an embodiment of the present invention.

The processing of lidar intensity images to provide additional depth information is split into two parts, setup and runtime, as illustrated by the flow diagram in FIG. 16.

Setup 1610. In FIG. 16 first phase of setup consists of camera calibration 1614 using a checkerboard 1612. Intensity images of a checkerboard target 1612 are taken using both lidar cameras and are processed using the MATLAB Stereo Camera Calibrator. A unique challenge in calibrating lidar cameras using intensity images compared to conventional imaging cameras is the presence of glare introduced by the lidar laser. This can be overcome by acquiring numerous checkerboard images 1612 at a variety of positions and angles until a suitable number of glare-free images have been acquired. A calibration of less than 0.1 pixels of reprojection error can provide sufficiently accurate camera parameters for stereo matching.

In order to assist the disparity algorithms in matching corresponding points in images between the left and right camera, the images can first be rectified in act 1616. Rectification 1616 applies a transform to both images such that all matching points line up along the same horizontal plane, thus reducing the search space for disparity algorithms. The drawback of rectification 1616 can be that the transformed image no longer has a one-to-one pixel correspondence with the original intensity image. Since image rectification 1616 is a non-linear transformation, the resulting processed image cannot be directly mapped to and merged with the original lidar depth image. To solve this issue, an optimization function is used to find an approximate geometric transform 1618 which converts the rectified image to back to the provided reference (original) image. The transform only needs to be computed once during setup and can then be reused during runtime for minimal processing overhead.

Runtime 1620. Further in FIG. 16, after acquiring depth and intensity images 1622 simultaneously from both lidar cameras, the intensity images are processed to extract further depth information. The narrow bandwidth light filter used in lidar sensors increases the shot noise of the intensity image compared to a conventional camera. This makes it more difficult for stereo disparity algorithms to match points between images. Using an optional pre-filter 1624 such as a median filter can helps to reduce this effect. After undergoing rectification 1626, the pixel disparity between left and right images can then be resolved. These and other embodiments of the present invention ca use the Semi-Global Matching (SGM) algorithm 1628, which is a well-established method of solving stereo matching. The use of a second median filter to replace small patches of missing pixels can be applied as an optional post-filter 1630. Pixel disparities are then converted to depth in act 1632 using the camera extrinsic parameters established during setup along with equation (1). The stereo depth image can be de-rectified in act 1634, allowing it to be realigned and combined by summing circuit 1636 with the original lidar depth image 1622 to form a final depth image 1638.

By trading off frame rate, multiple consecutive intensity images can be taken and averaged to extract further detail. Using this technique, an object, for example a human figure, is able to be resolved to a distance as far as 18 meters, increasing the native lidar depth range of the human figure by over 2×. A degradation in accuracy with distance can be observed with a root-mean squared error of 1 meter at the maximum distance.

9. Multiple Lidar Units

Depending on their intended purpose or application, lidar sensors can be designed to meet different field of view (FOV) and different range requirements. For example, an automobile (e.g., a passenger car) outfitted with lidar for autonomous driving might be outfitted with multiple separate lidar sensors including a forward-facing long range lidar sensor, a rear-facing short-range lidar sensor and one or more short-range lidar sensors along each side of the car.

Figure 17:
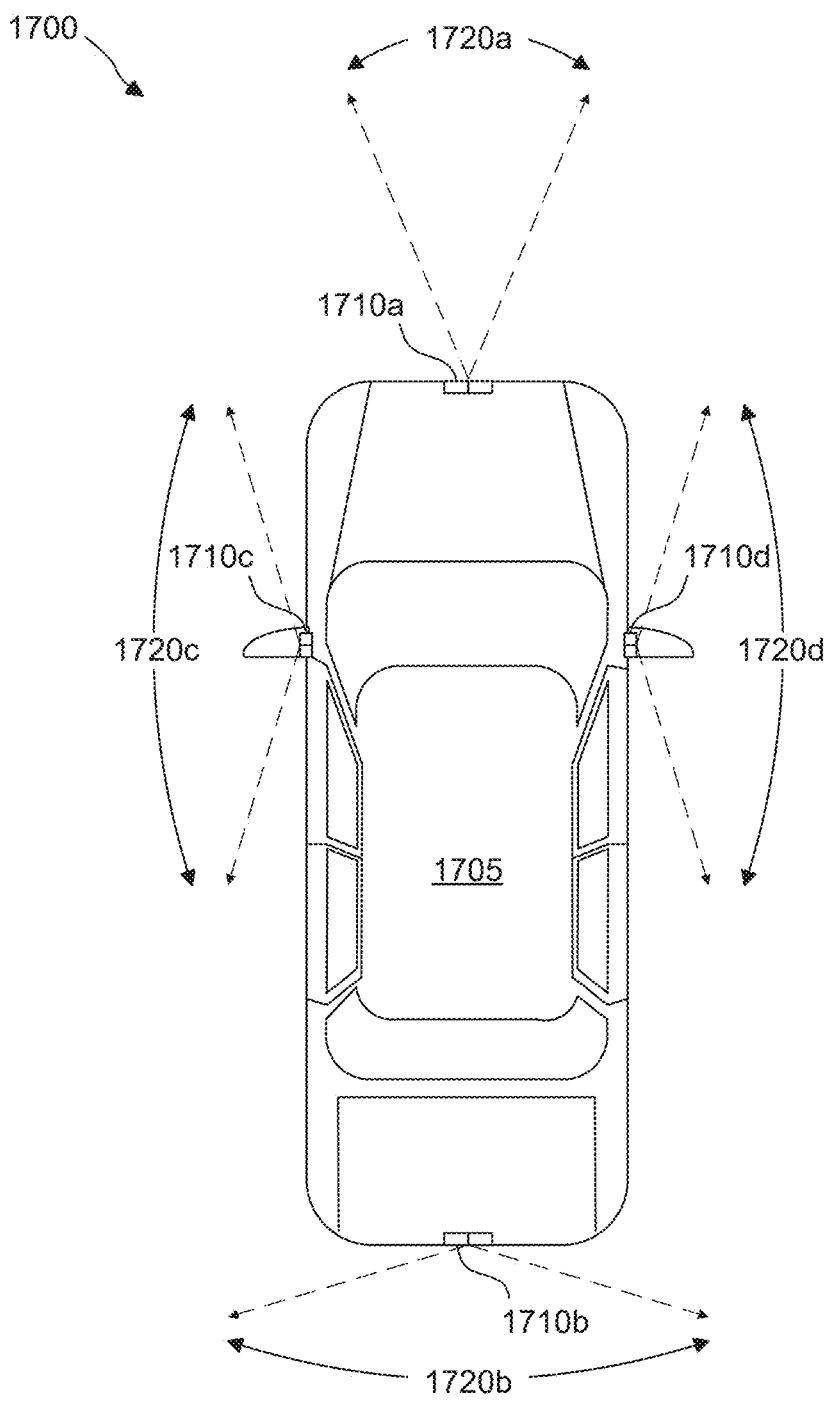
FIG. 17 is a simplified illustration of an automobile in which four solid-state flash lidar sensors are included at different locations along the automobile.

FIG. 17 is a simplified illustration of an automobile 1700 in which four solid-state flash lidar sensors 1710*a*-1710*d* are included at different locations along the automobile. The number of lidar sensors, the placement of the lidar sensors, and the fields of view of each individual lidar sensors can be chosen to obtain a majority of, if not the entirety of, a 360-degree field of view of the environment surrounding the vehicle some portions of which can be optimized for different ranges. For example, lidar sensor 1710*a*, which is shown in FIG. 17 as being positioned along the front bumper of automobile 1700, can be a long-range (200 meter), narrow field-of-view unit, while lidar sensors 1710*b*, positioned along the rear bumper, and lidar systems 1710*c*, 1710*d*, positioned at the side mirrors, are short-range (50 meter), wide field-of-view systems.

Despite being designed for different ranges and different fields of view, each of the lidar sensors 1710*a*-1710*d* can be a lidar system according to embodiments disclosed herein. Indeed, in some embodiments, the only difference between each of the lidar sensors 1710*a*-1710*d* is the properties of the diffuser (e.g., diffuser 136). For example, in long range, narrow field-of-view lidar sensor 1710*a*, the diffuser 136 is engineered to concentrate the light emitted by the emitter array of the lidar system over a relatively narrow range enabling the long-distance operation of the sensor. In the short-range, wide field-of-view lidar sensor 1710*b*, the diffuser 136 can be engineered to spread the light emitted by the emitter array over a wide angle (e.g., 180 degrees). In each of the lidar sensors 1710*a* and 1710*b*, the same emitter array, the same pixel array and the same controller, etc. can be used thus simplifying the manufacture of multiple different lidar sensors tailored for different purposes. Any or all of lidar sensors 1710*a*-1710*d* can incorporate the circuits, methods, and apparatus that can provide sensor arrays that are able to avoid or limit saturation of SPAD devices from both ambient and reflected light while maintaining sufficient sensitivity for generating a lidar image as described herein.

10. Additional Embodiments

In the above detailed description, numerous specific details are set forth to provide a thorough understanding of embodiments of the present disclosure. However, it will be understood by those skilled in the art that the present disclosure can be practiced without these specific details. For example, while various embodiments set forth above described can use different numbers of cycles and different power levels, these and other embodiments can use still other numbers of cycles and different power levels. Also, incident photons can be detected for various numbers of time bins that can extend to different time bins. As another example, some of the embodiments discussed above include a specific number of regions or diodes in a SPAD device. It is to be understood that those embodiments are for illustrative purposes only and embodiments are not limited to any particular number of regions or diodes in a SPAD device.

Additionally, in some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment can be incorporated in different embodiments although not specifically described relative thereto. That is, all embodiments and/or features of any embodiments can be combined in any way and/or combination.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A method of generating a lidar image comprising:
receiving a distance value for one or more pixels in a lidar system;
in the one or more pixels, accumulating photon counts over a number of cycles for bins in a range, where the range is determined by the distance value; and
using the accumulated photon counts to generate an image.

2. The method of claim 1 wherein the distance value is provided by a stereo camera.

3. An electronic system comprising:
a stereo camera; and
a lidar system coupled to the stereo camera,
wherein the stereo camera is configured to provide time intervals to the lidar system.

4. The electronic system of claim 3 wherein the lidar system uses the provided time intervals to determine which bins to accumulate photon counts for.

5. A method of generating a lidar image, the method comprising:

acquiring images using a stereo camera;
generating stereo depth estimates;
mapping the stereo depth estimates to lidar sensor pixels;
converting the stereo depth estimates to coarse time intervals;
providing the coarse time intervals to a lidar system; and
acquiring lidar data with the lidar system.

6. The method of claim 1 wherein the distance value is provided using previously accumulated photon counts.

7. The method of claim 6 wherein the previously accumulated photon counts are generated for a wider distance and the range is a narrower distance than the wider distance.

8. The method of claim 7 wherein the distance value is provided by binning the previously accumulated photon counts.

9. The method of claim 8 wherein the range is determined by:
generating a narrowed window centered at least approximately on a peak; and
using the narrowed window as the range.

10. The method of claim 2 further comprising:
using the stereo camera to determine a coarse depth estimate; and
using the coarse depth estimate to determine the range.

11. The electronic system of claim 4 wherein the stereo camera is configured to determine coarse depth estimates and to use the coarse depth estimates to provide the time intervals to the lidar system.

12. The electronic system of claim 11 wherein the stereo camera is configured to:
acquire camera images;
use the acquired camera images to generate stereo depth estimates; and
map the stereo depth estimates to lidar sensor pixels.

13. The electronic system of claim 12 wherein the stereo camera is further configured to:
convert the stereo depth estimates to time intervals; and
provide the time intervals to the lidar system.

14. The electronic system of claim 13 wherein the lidar system is configured to acquire lidar data over the time intervals.

15. The method of claim 5 wherein the stereo depth estimates are generated using the acquired camera images.

16. The method of claim 15 wherein the lidar data is acquired by the lidar system for the coarse time intervals.

* * * * *